(12) United States Patent
Shaikh et al.

(10) Patent No.: US 12,162,001 B2
(45) Date of Patent: *Dec. 10, 2024

(54) MAGNETIC-NANOPARTICLE-SUPPORTED CATALYST AND METHOD OF MAKING

(71) Applicant: KING FAHD UNIVERSITY OF PETROLEUM AND MINERALS, Dhahran (SA)

(72) Inventors: M. Nasiruzzaman Shaikh, Dhahran (SA); S. M. Shakil Hussain, Dhahran (SA); Md. Abdul Aziz, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,097

(22) Filed: Mar. 15, 2024

(65) Prior Publication Data
US 2024/0286121 A1    Aug. 29, 2024

Related U.S. Application Data

(63) Continuation of application No. 17/893,841, filed on Aug. 23, 2022, now Pat. No. 11,980,875.

(51) Int. Cl.
*B01J 31/16*     (2006.01)
*B01J 31/24*     (2006.01)
(Continued)

(52) U.S. Cl.
CPC ....... *B01J 31/1625* (2013.01); *B01J 31/2414* (2013.01); *B01J 35/23* (2024.01);
(Continued)

(58) Field of Classification Search
None
See application file for complete search history.

(56) References Cited

U.S. PATENT DOCUMENTS

| 5,698,745 A | 12/1997 | Burke et al. |
| 10,463,391 B2 | 11/2019 | Shaikh et al. |
| 2018/0099987 A1 | 4/2018 | Shaikh et al. |

FOREIGN PATENT DOCUMENTS

| CN | 101176853 B | 11/2010 |
| CN | 103111330 B | 4/2015 |

(Continued)

OTHER PUBLICATIONS

Duanmu, et al.; Magnetic nanoparticle supported triphenylphosphine ligand for the Rh-catalyzed hydroformylation reaction; Catalysis Communications, vol. 48; pp. 45-49; Mar. 10, 2014; Abstract Only; 2 Pages.

(Continued)

*Primary Examiner* — Yun Qian
(74) *Attorney, Agent, or Firm* — Oblon, McClelland, Maier & Neustadt, L.L.P.

(57) ABSTRACT

A method for making a magnetic-nanoparticle-supported catalyst includes reacting a ferrocenyl phosphine compound with an amino alcohol compound to form a ligand having a phosphine group, an amine group and at least one hydroxyl group; anchoring the ligand to a surface of magnetic nanoparticles via an oxygen atom of the hydroxyl group to form a ligand complex; combining the ligand complex with a metal precursor comprising Rh to bind the metal precursor with the ligand complex and form the magnetic-particle-supported catalyst. The magnetic-particle-supported catalyst is a Rh complex of magnetic-$Fe_3O_4$-nanoparticle-supported ferrocenyl phosphine catalyst.

9 Claims, 33 Drawing Sheets

(51) Int. Cl.
*B01J 35/23* (2024.01)
*B01J 35/30* (2024.01)
*B01J 37/16* (2006.01)
*B82Y 30/00* (2011.01)

(52) U.S. Cl.
CPC ............ *B01J 35/393* (2024.01); *B01J 37/16* (2013.01); *B01J 2231/321* (2013.01); *B82Y 30/00* (2013.01)

(56) References Cited

FOREIGN PATENT DOCUMENTS

| | | |
|---|---|---|
| CN | 104475161 B | 9/2016 |
| EP | 0023923 B1 | 8/1985 |

OTHER PUBLICATIONS

Shaikh, et al.; Magnetic nanoparticle-supported ferrocenylphosphine: a reusable catalyst for hydroformylation of alkene and Mizoroki-Heck olefination; RSC Advances, Issue 48 : 2016 ; Abstract Only ; 3 Pages.

MAGNETIC-NANOPARTICLE-SUPPORTED CATALYST AND METHOD OF MAKING

CROSS REFERENCE TO RELATED APPLICATION

The present application is a Continuation of U.S. application Ser. No. 17/893,841, now allowed, having a filing date of Aug. 23, 2022.

STATEMENT REGARDING PRIOR DISCLOSURE BY THE INVENTORS

Aspects of this technology are described in an article "Rh-complex supported on magnetic nanoparticles as catalysts for hydroformylations and transfer hydrogenation reactions" published in Asian Journal of Organic Chemistry, 2022, Volume 11, Issue 4, on Mar. 18, 2022, which is incorporated herein by reference in its entirety.

BACKGROUND

Technical Field

The present disclosure is directed to catalysis, particularly to a method for making a magnetic-nanoparticle-supported catalyst.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Catalysis plays an essential role in our daily life. The development of sustainable and cost-effective catalysts is crucial for the fundamental investigation and production of fine chemicals, fuel, polymers, and pharmaceutical ingredients. Conventionally, cobalt (Co-), nickel (Ni-), rhodium (Rh-), iridium (Ir-), palladium (Pd-), platinum (Pt-), ruthenium (Ru-), and gold (Au)-based homogeneous catalysts are used to hydrogenate alkenes, N-heteroarenes, ketones, and nitroaromatics with optimum efficiency [J. Yuwen, S. Chakraborty, W. W. Brennessel and W. D. Jones, ACS Catal., 2017, 7, 3735-3740; M. Shevlin, M. R. Friedfeld, H. Sheng, N. A. Pierson, J. M. Hoyt, L.-C. Campeau and P. J. Chirik, J. Am. Chem. Soc., 2016, 138, 3562-3569; T. T. Co, S. C. Shim, C. S. Cho, T. J. Kim, S. O. Kang, W. S. Han, J. Ko and C. K. Kim, Organometallics, 2005, 24, 4824-4831; A. Vandekerkhove, L. Claes, F. De Schouwer, C. Van Goethem, I. F. J. Vankelecom, B. Lagrain and D. E. De Vos, ACS Sustain. Chem. & Eng., 2018, 6, 9218-9228; T. T. Co and T.-J. Kim, Chem. Commun., 2006, 3537-3539; Y.-T. Xia, J. Ma, X.-D. Wang, L. Yang and L. Wu, Catal. Sci. Technol., 2017, 7, 5515-5520; X. Zhang, L. J. Durndell, M. A. Isaacs, C. M. A. Parlett, A. F. Lee and K. Wilson, ACS Catal., 2016, 6, 7409-7417; M. C. MacInnis, D. F. MacLean, R. J. Lundgren, R. McDonald and L. Turculet, Organometallics, 2007, 26, 6522-6525; and R. J. Harris, K. Nakafuku and R. A. Widenhoefer, Chem. —A Eur. J., 2014, 20, 12245-12254]. In yet another conventional method, Pd and Ir complexes of lutidine-derived bis-N-heterocyclic carbene (NHC)/phosphine mixed pincer ligands for the hydrogenation of ketones [11], 1,1'-Bi-2-naphthol (BINOL) phosphoramidite-based Ir complexes for the hydrogenation of quinolines, and Rh and Pd-based iminophosphoranyl ferrocene complexes for the allylic alkylation of β-keto esters were reported [N. Mršić, L. Lefort, J. A. F. Boogers, A. J. Minnaard, B. L. Feringa and J. G. de Vries, Adv. Synth. & Catal., 2008, 350, 1081-1089; T. C. Thanh, C. S. Sang, S. C. Chan, D. U. Kim and T. J. Kim, Bull. Korean Chem. Soc., 2005, 26, 1359-1365]. Although homogeneous catalysts based on transition metals demonstrate high reactivity and selectivity, the cumbersome multi-step preparation process of ligands, ambient stability, tedious separation of products from the reaction mixture, and limited reusability of the precious metal often impedes their broad commercialization.

The immobilization of active metal complexes on the solid support increases dispersion and enhances the accessibility of the active metal sites [M. Nasiruzzaman Shaikh, Md. Abdul Aziz, Abdul Nasar Kalanthoden, Aasif Helal, Abbas S. Hakeem, Catal. Sci. Technol., 2018, 2018, 8, 4709]. It is worth noting that a prudent choice of solid support in a catalytic system is crucial for obtaining the optimum conversion, greater selectivity, and extensive reusability. Conventionally, zeolite, silica, polymers, metal oxides, and cellulosic supports have been tested as catalytic systems [P. S. Murthy, Z. Wang, L. Wang, J. Zhao, Z. Wang, W. Liang and J. Huang, Energy & Fuels, 2020, 34, 16320-16329; F. Deng, N. Li, S. Tang, C. Liu, H. Yue and B. Liang, Chem. Eng. J., 2018, 334, 1943-1953; P. Zhao, X. Feng, D. Huang, G. Yang and D. Astruc, Coord. Chem. Rev., 2015, 287, 114-136; X. Le, Z. Dong, X. Li, W. Zhang, M. Le and J. Ma, Catal. Commun., 2015, 59, 21-25; F. Rezaei and M. Dinari, Colloids Surfaces A Physicochem. Eng. Asp., 2021, 618, 126441; M. Li and G. Chen, Nanoscale, 2013, 5, 11919-11927; Y. Imura, M. Maniwa, K. Iida, H. Saito, C. Morita-Imura and T. Kawai, ACS Omega, 2021, 6, 16043-16048; R. Cai, P. R. Ellis, J. Yin, J. Liu, C. M. Brown, R. Griffin, G. Chang, D. Yang, J. Ren, K. Cooke, P. T. Bishop, W. Theis and R. E. Palmer, Small, 2018, 14, 1703734; M. N. Shaikh, RSC Adv., 2019, 9, 28199-28206; T. Yamada, W. Teranishi, K. Park, J. Jiang, T. Tachikawa, S. Furusato and H. Sajiki, ChemCatChem, 2020, 12, 4052-4058]. These solid-supported catalytic systems produced excellent results in terms of reactivity and selectivity [R. Abu-Reziq, H. Alper, D. Wang and M. L. Post, J. Am. Chem. Soc., 2006, 128, 5279-5282; R. Rahi, M. Fang, A. Ahmed and R. A. Sánchez-Delgado, Dalt. Trans., 2012, 41, 14490-14497; M. Fang and R. A. Sánchez-Delgado, J. Catal., 2014, 311, 357-368; D. Ge, L. Hu, J. Wang, X. Li, F. Qi, J. Lu, X. Cao and H. Gu, ChemCatChem, 2013, 5, 2183-2186; M. Guo, C. Li and Q. Yang, Catal. Sci. Technol., 2017, 7, 2221-2227]. However, it requires post-reaction separation either by filtration, precipitation, or centrifugation, each of which diminishes the prospect of recyclability due to the gradual loss of material in every cycle [A. R. McDonald, C. Müller, D. Vogt, G. P. M. van Klink and G. van Koten, Green Chem., 2008, 10, 424-432]. In addition, the bond holding the catalyst seems more fragile, which results in the leaching of the active metal center out of the solid surface. Hence, there is a need for catalytic support due to the low-cost raw materials and simple synthesis protocol.

In view of the forgoing, one objective of the present disclosure is to provide a method of making Rh-complex of ligand anchored magnetic-nanoparticle-supported catalysts for hydrogen transfer and hydroformylation reactions. An amino alcohol modified ferrocenyl phosphine ligand is firstly anchored on a surface of $Fe_3O_4$ nanoparticles, followed by complexing with a rhodium (Rh) catalyst to form a Rh complex of magnetic-$Fe_3O_4$-nanoparticle-supported ferrocenyl phosphine catalyst. A further objective of the present disclosure is to provide methods for converting terminal olefins into one or more aldehydes, and hydrogenating nitroarenes and N-heteroarenes in the presence of the Rh complex of magnetic-$Fe_3O_4$-nanoparticle-supported ferrocenyl phosphine catalyst.

SUMMARY

In an exemplary embodiment, a method for making a magnetic-nanoparticle-supported catalyst for hydrogen transfer and hydroformylation reactions is described. The method for making the magnetic-nanoparticle-supported catalyst includes reacting a ferrocenyl phosphine compound with an amino alcohol compound to form a ligand having a phosphine group, an amine group and at least one hydroxyl group. The method also includes anchoring the ligand to a surface of magnetic nanoparticles via an oxygen atom of the hydroxyl group to form a ligand complex. In addition, the method includes combining the ligand complex with a metal precursor comprising Rh to bind the metal precursor with the ligand complex and form the magnetic-particle-supported catalyst.

In another exemplary embodiment, the method for making the magnetic-nanoparticle-supported catalyst for hydrogen transfer and hydroformylation reactions further includes acylating a ferrocene and reductive aminating with an alkylamine to provide an alkylamine substituted ferrocene. In addition, the method includes phosphorylating the alkylamine substituted ferrocene with an organophosphorus compound to provide an alkylamine substituted ferrocenyl phosphine. Furthermore, the method includes acylating the alkylamine substituted ferrocenyl phosphine to provide the ferrocenyl phosphine compound.

In some embodiments, the alkylamine is dimethylamine, the organophosphorus compound is diphenylphosphine chloride, the alkylamine substituted ferrocenyl phosphine is N,N-dimethyl-1-[-2-(diphenyl phospheno)ferrocenyl]ethylamine (PPFA), the ferrocenyl phosphine compound is 1-[-2-(diphenyl phospheno)ferrocenyl] ethylacetate (PPFA-OAc), the amino alcohol compound is dopamine (dop) hydrochloride, the ligand is dopamine ferrocenyl phosphine (dop-Fc), the magnetic nanoparticles are superparamagnetic $Fe_3O_4$ nanoparticles in the form of spheres, the ligand complex is magnetic-$Fe_3O_4$-nanoparticle-supported dopamine ferrocenyl phosphine, the metal precursor is bicyclo[2.2.1]hepta-2,5-diene-rhodium(I) chloride dimer, and the magnetic-particle-supported catalyst is a Rh complex of magnetic-$Fe_3O_4$-nanoparticle-supported ferrocenyl phosphine catalyst.

In some embodiments, the method includes sonicating the magnetic nanoparticles to form a suspension. Additionally, the method further includes mixing the ligand and the suspension, followed by sonicating to form a ligand anchored magnetic suspension. In addition, the method includes collecting the ligand anchored magnetic nanoparticles within the ligand anchored magnetic suspension with a magnet and decanting the magnetic suspension. In other embodiments, the magnetic nanoparticles are $Fe_3O_4$ nanoparticles, the ligand is dop-Fc, and the ligand anchored magnetic nanoparticles are magnetic-$Fe_3O_4$-nanoparticle-supported dopamine ferrocenyl phosphine nanoparticles.

In some embodiments, the method includes hydroformylating a terminal olefin in the presence of the magnetic-nanoparticle-supported catalyst and a syngas mixture comprising CO and $H_2$ to form an aldehyde. In addition, a molar ratio of CO to $H_2$ in the syngas mixture is in a range of 10:1 to 1:10 for the hydroformylating. Furthermore, the hydroformylating is carried out under a gas pressure in a range of 20 to 100 bar.

In some embodiments, the hydroformylating forms a mixture comprising branched aldehydes and linear aldehydes. In addition, a ratio of the branched aldehydes to linear aldehydes in the hydroformylating is in a range of 1:1 to 20:1.

In some embodiments, an amount of the magnetic-nanoparticle-supported catalyst used in the hydroformylating is from 1 to 20 milligrams per millimole of the terminal olefin. In other embodiments, a concentration of the terminal olefin used in the hydroformylating is from 0.01 to 0.5 millimoles per milliliter of a solvent used in the hydroformylating.

In some embodiments, the method further includes hydrogenating one or more nitroarenes and/or N-heteroarenes in the presence of the magnetic-nanoparticle-supported catalyst with a mixture of water and tetrahydroxydiboron to form one or more aminoarenes and/or hydrogenated N-heteroarenes.

In some embodiments, the method further includes hydrogenating one or more substituted and/or unsubstituted quinolines in the presence of the magnetic-nanoparticle-supported catalyst with a mixture of water and tetrahydroxydiboron to form one or more substituted and/or unsubstituted tetrahydroquinolines.

In some embodiments, in the hydroformylation catalyst, the magnetic-nanoparticle-supported catalyst has 0.2 to 0.3 millimoles (mmol) of Rh per gram of the catalyst.

In some embodiments, the magnetic-nanoparticle-supported catalyst has a particle size in a longest dimension of 5 nm to 10 nm.

In some embodiments, individual crystals of magnetite ($Fe_3O_4$) within the magnetic-nanoparticle-supported catalyst have an interplanar distance of 0.2 nm to 0.25 nm between the individual crystals.

In some embodiments, the individual crystals of magnetite are uniformly distributed throughout the magnetic-nanoparticle-supported catalyst.

In some embodiments, the magnetic-nanoparticle-supported catalyst has a crystalline morphology.

In some embodiments, a Rh complex of magnetic-$Fe_3O_4$-nanoparticle-supported ferrocenyl phosphine catalyst was prepared by the method.

In some embodiments, the catalyst has a formula (I),

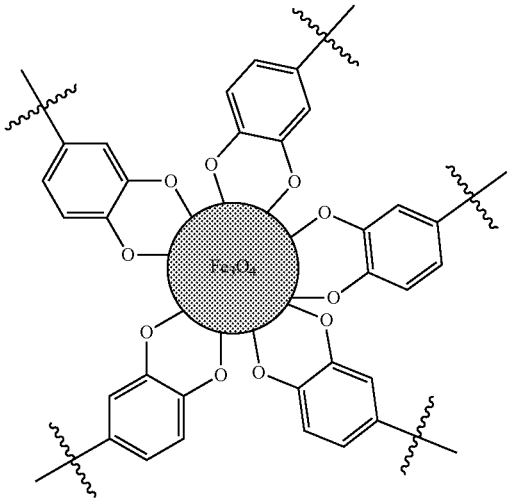

Formula [I]

in which [—ξ—] represents a formula [II]

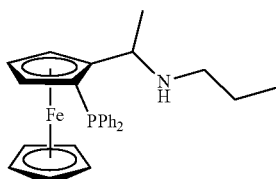

Formula [II]

In some embodiments, the catalyst has a particle size in a longest dimension of 5 nm to 10 nm.

In some embodiments, individual crystals of magnetite ($Fe_3O_4$) within the catalyst have an interplanar distance of 0.2 nm to 0.25 nm between the individual crystals.

In some embodiments, the individual crystals of magnetite are uniformly distributed throughout the catalyst.

In some embodiments, the catalyst has a crystalline morphology.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
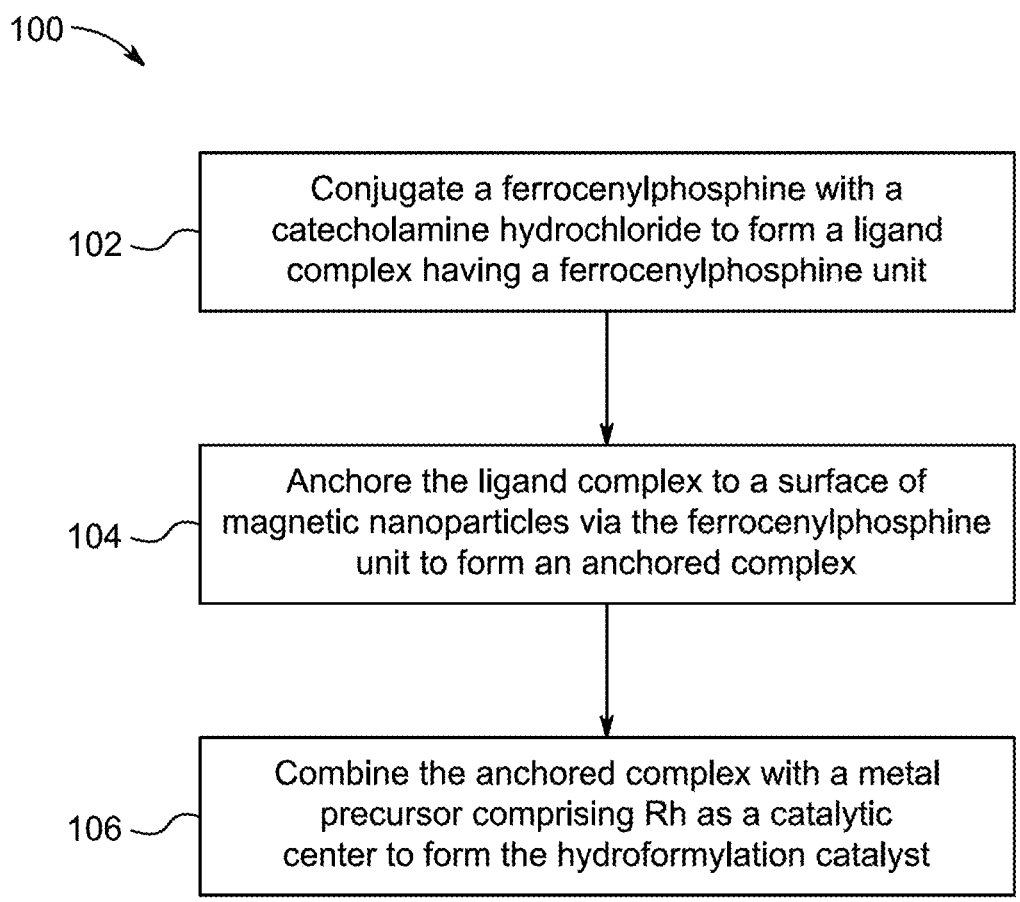
FIG. 1 is a schematic flow diagram of a method for making a hydroformylation catalyst, according to certain embodiments.
Figure 2A:
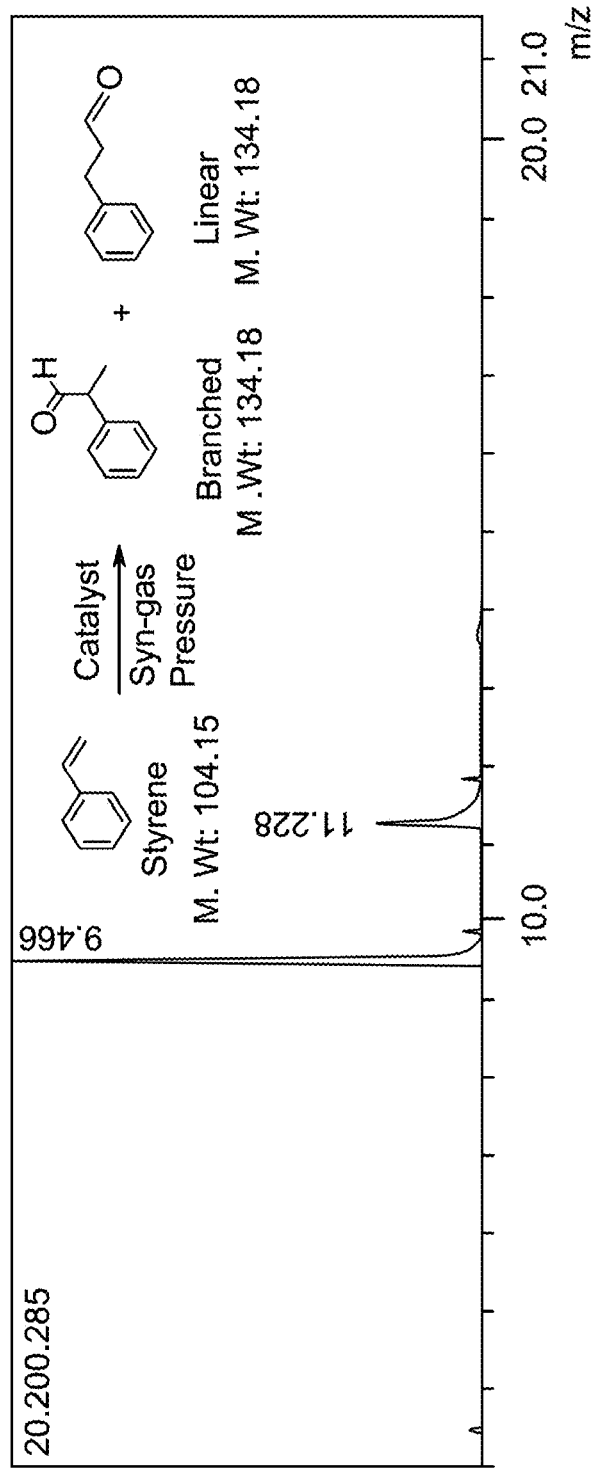
FIG. 2A illustrates a gas chromatography (GC) of hydroformylations of styrene, according to certain embodiments.
Figure 2B:
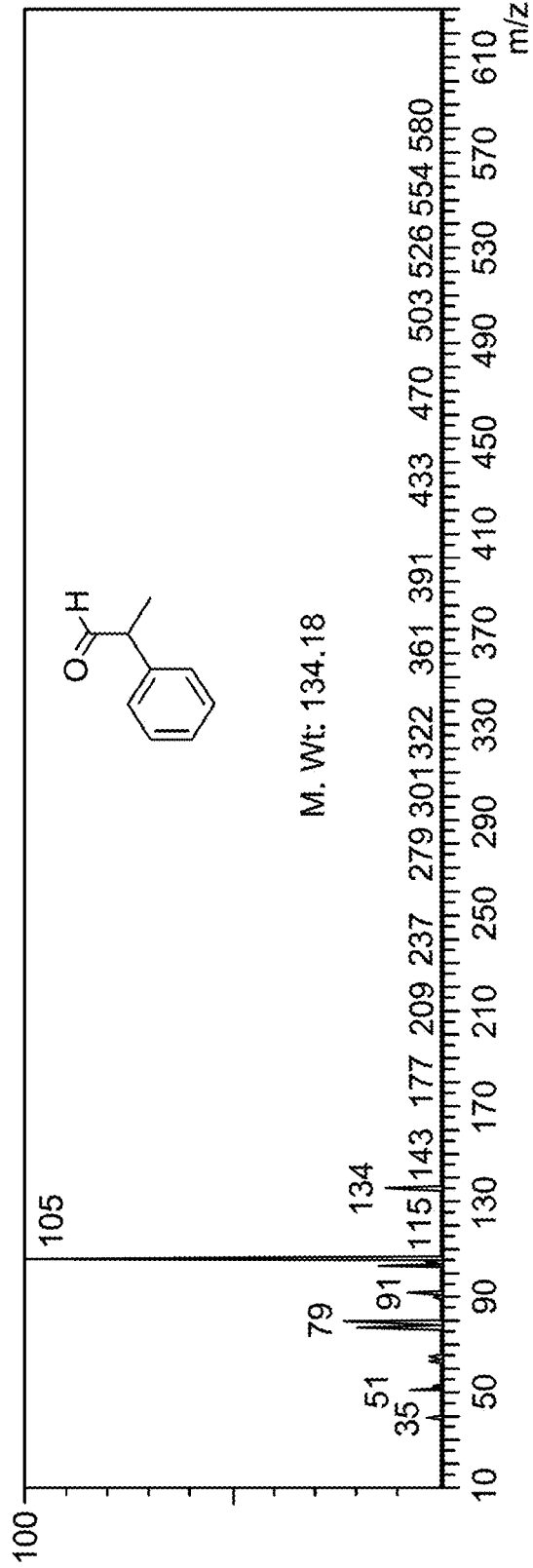
FIG. 2B illustrates a gas chromatography-mass spectrometry (GC-MS) of fragments at retention time ($R_t$)=9.5 of hydroformylations of styrene, according to certain embodiments.
Figure 2C:
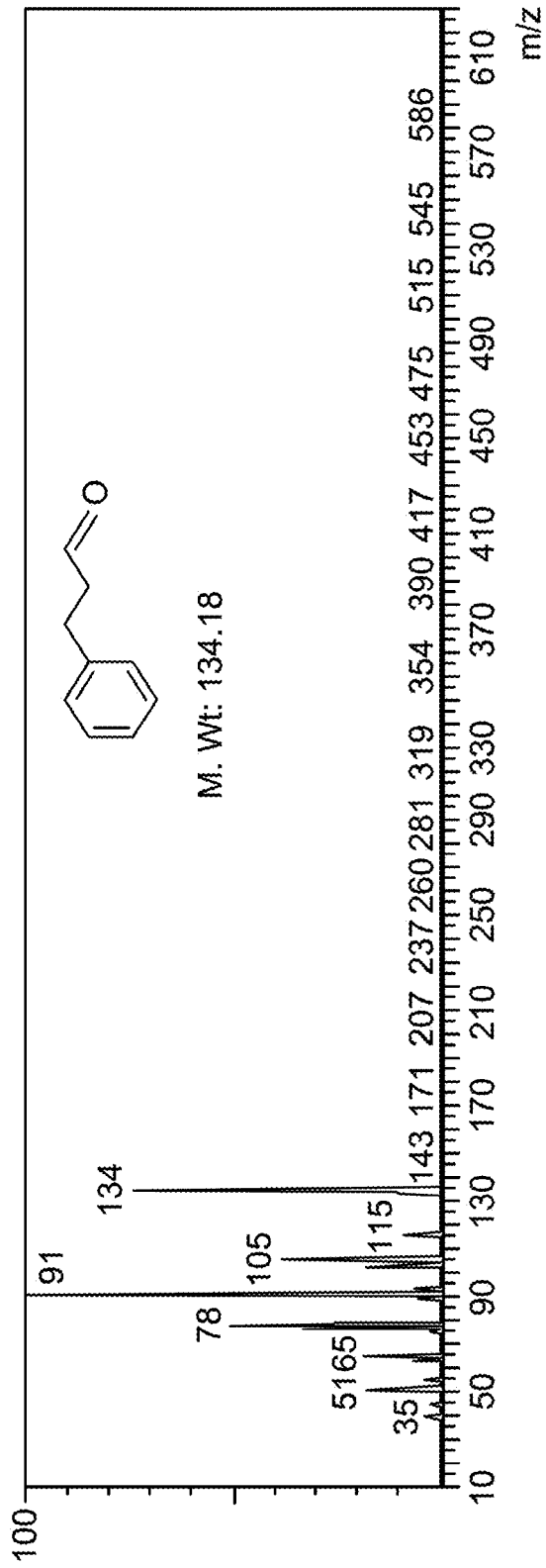
FIG. 2C illustrates GC-MS of fragments at $R_t$=11.2 of hydroformylations of styrene, according to certain embodiments.
Figure 3A:
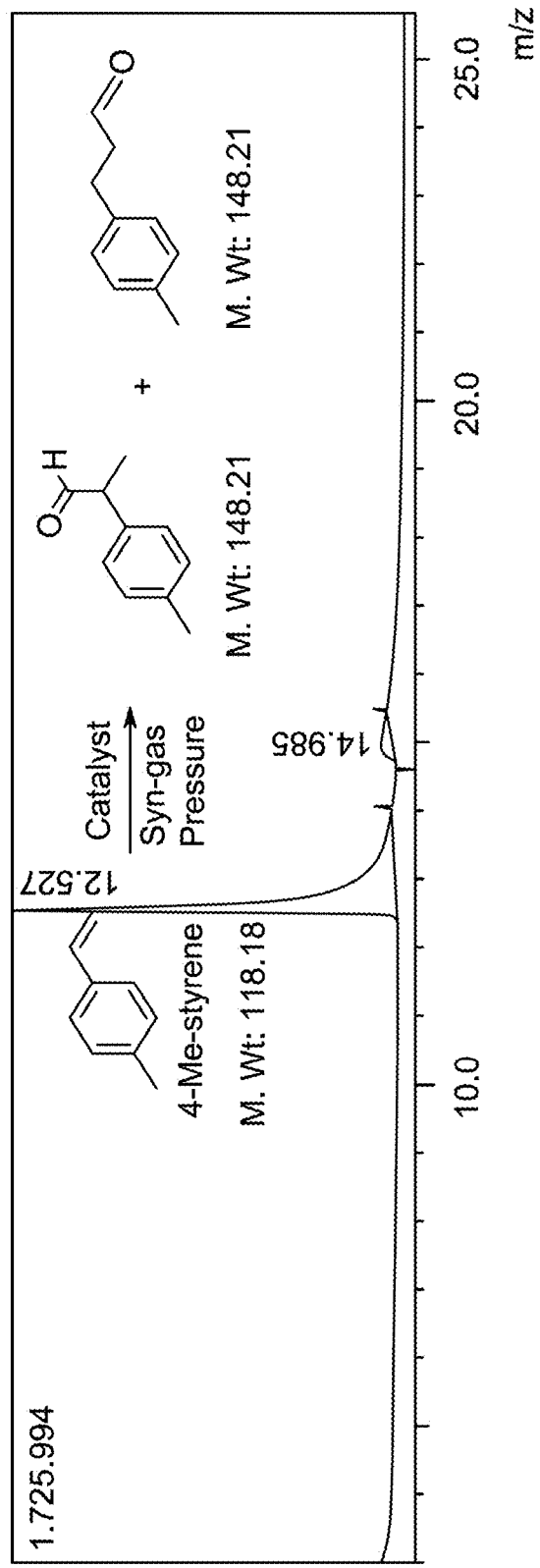
FIG. 3A illustrates GC of hydroformylations of 4-methylstyrene, according to certain embodiments.
Figure 3B:
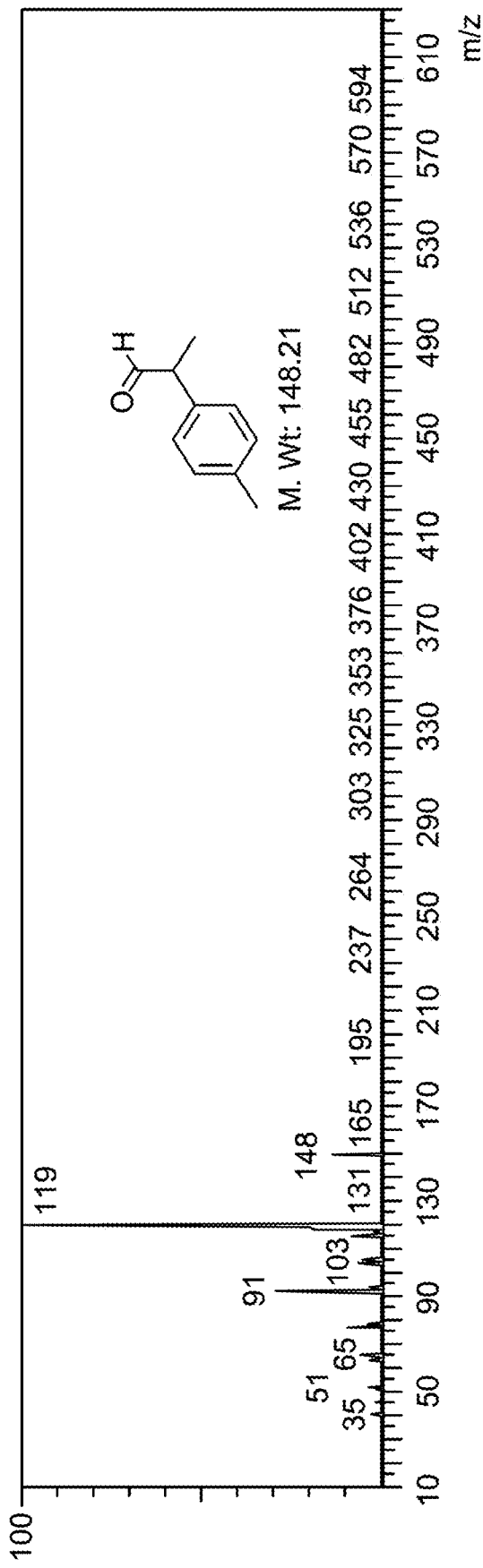
FIG. 3B illustrates GC-MS of fragments at $R_t$=12.54 of hydroformylations of 4-methylstyrene, according to certain embodiments.
Figure 3C:
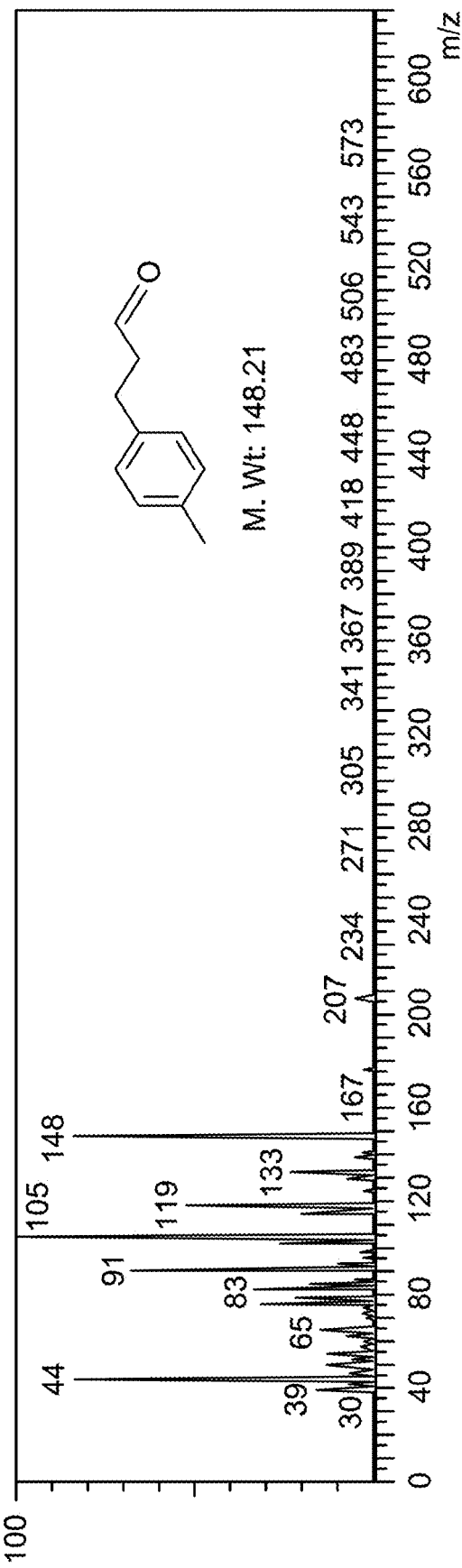
FIG. 3C illustrates GC-MS of fragments at $R_t$=14.95 of hydroformylations of 4-methylstyrene, according to certain embodiments.
Figure 4A:
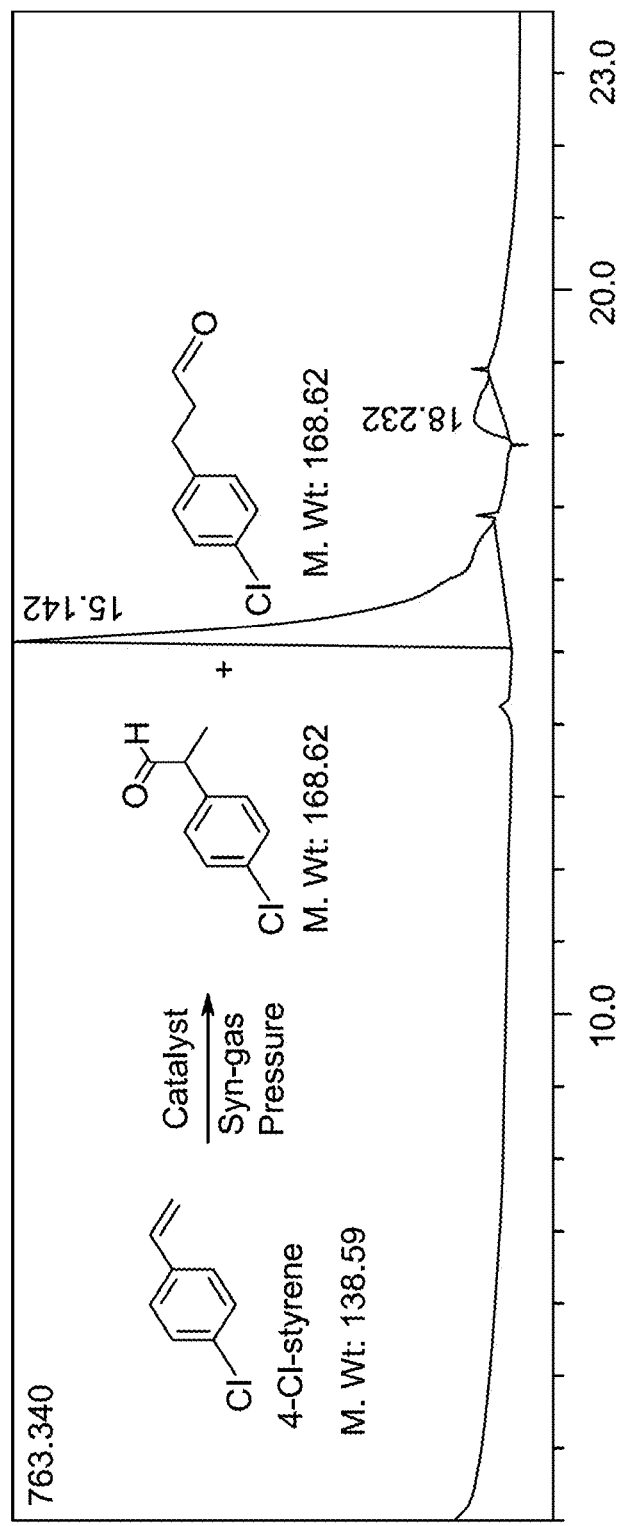
FIG. 4A illustrates GC of hydroformylations of 4-chlorostyrene, according to certain embodiments.
Figure 4B:
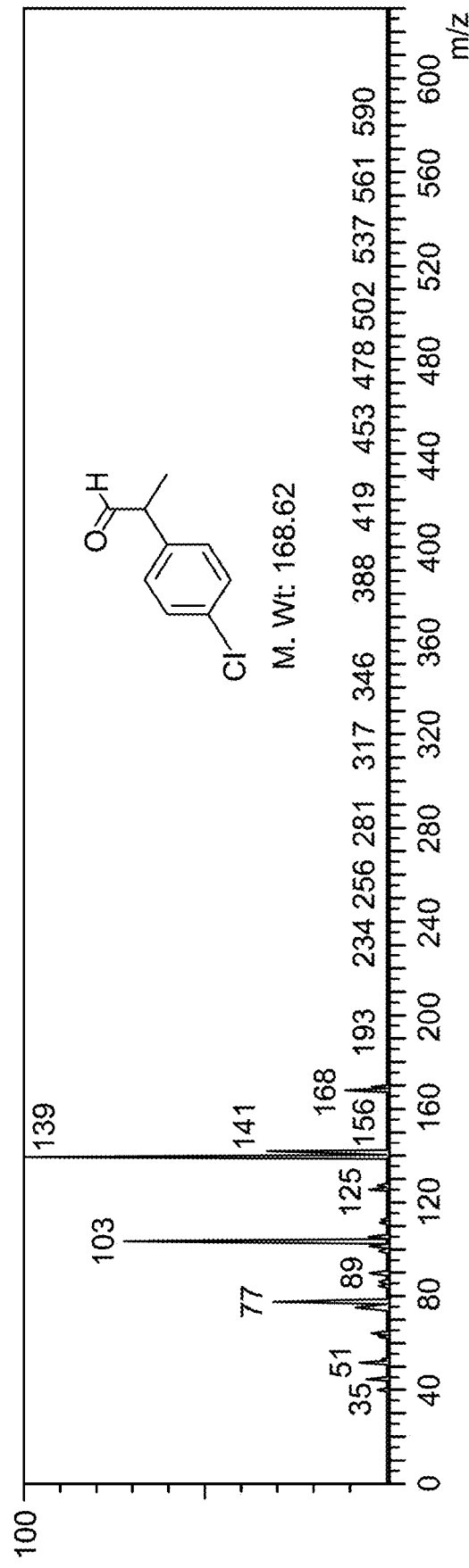
FIG. 4B illustrates GC-MS of fragments at $R_t$=15.17 of hydroformylations of 4-chlorostyrene, according to certain embodiments.
Figure 4C:
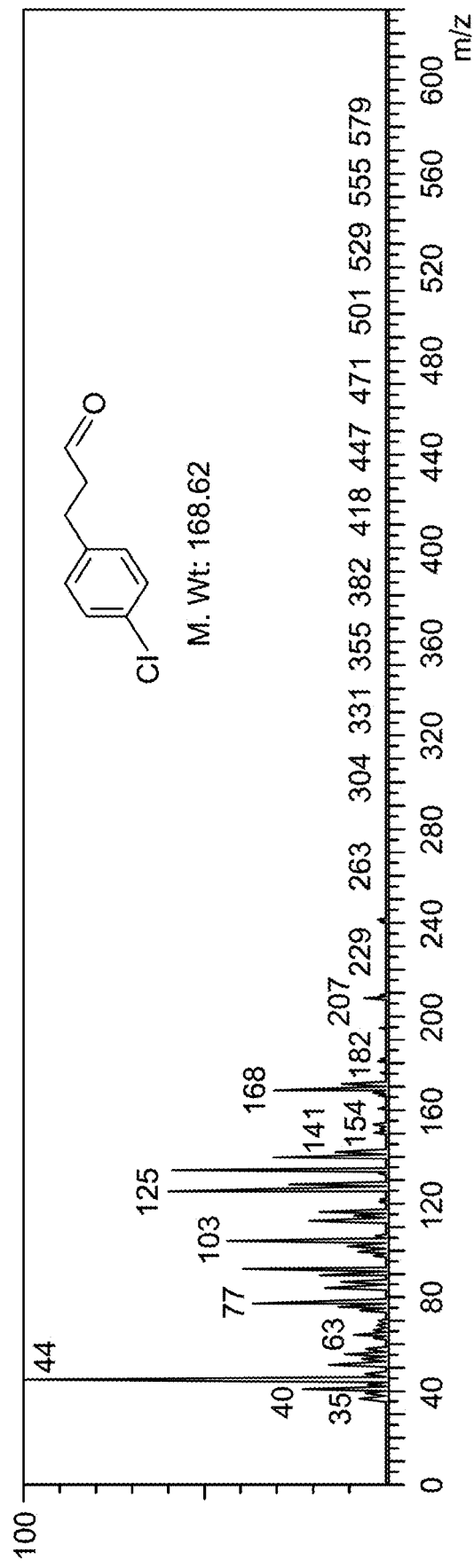
FIG. 4C illustrates GC-MS of fragments at $R_t$=18.20 of hydroformylations of 4-chlorostyrene, according to certain embodiments.
Figure 5A:
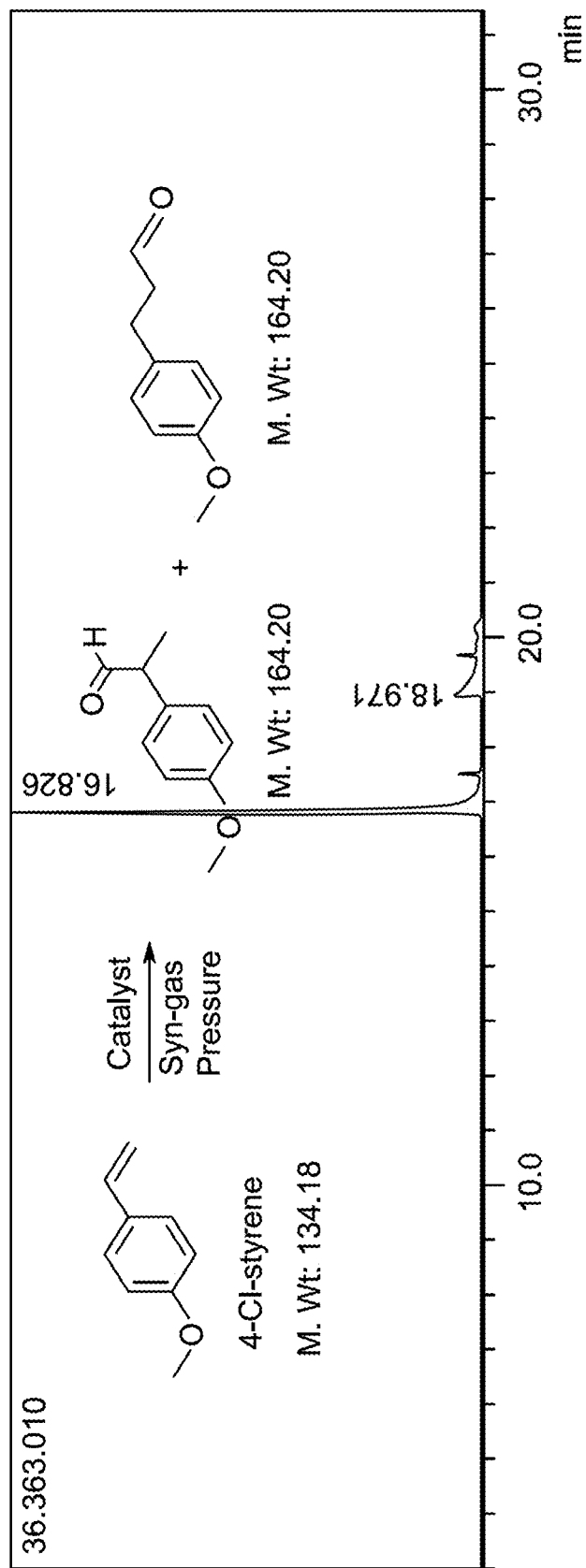
FIG. 5A illustrates GC of hydroformylations of 4-methoxystyrene, according to certain embodiments.
Figure 5B:
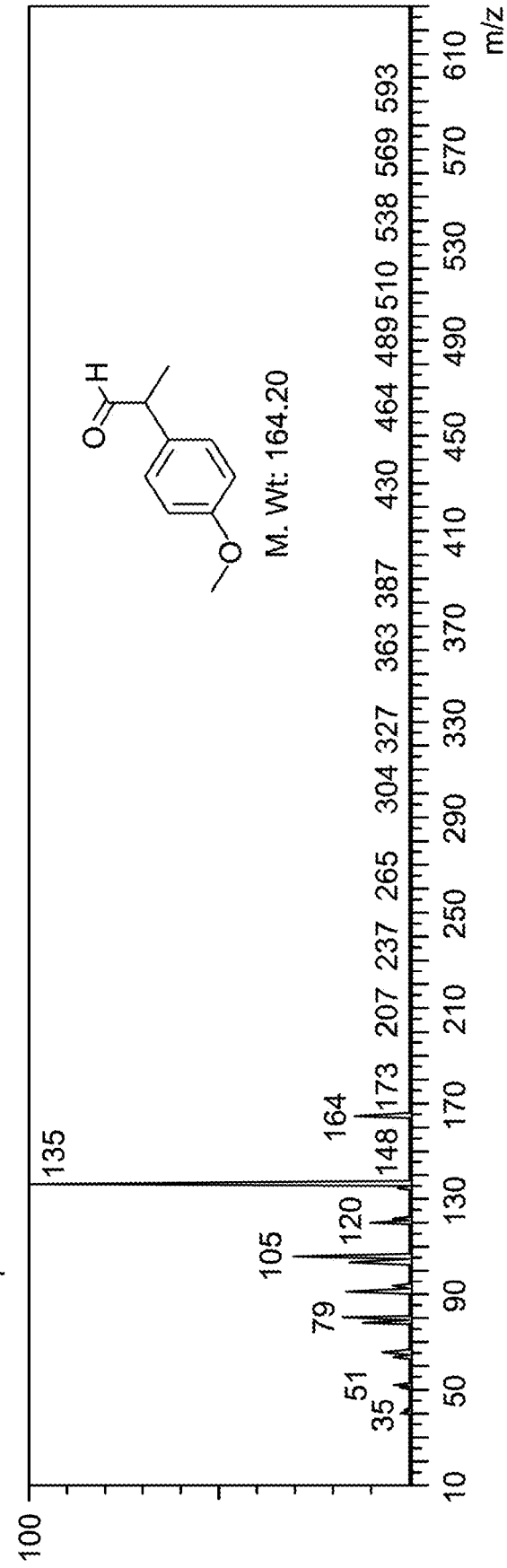
FIG. 5B illustrates GC-MS of fragments at $R_t$=16.85 of hydroformylations of 4-methoxystyrene, according to certain embodiments.
Figure 5C:
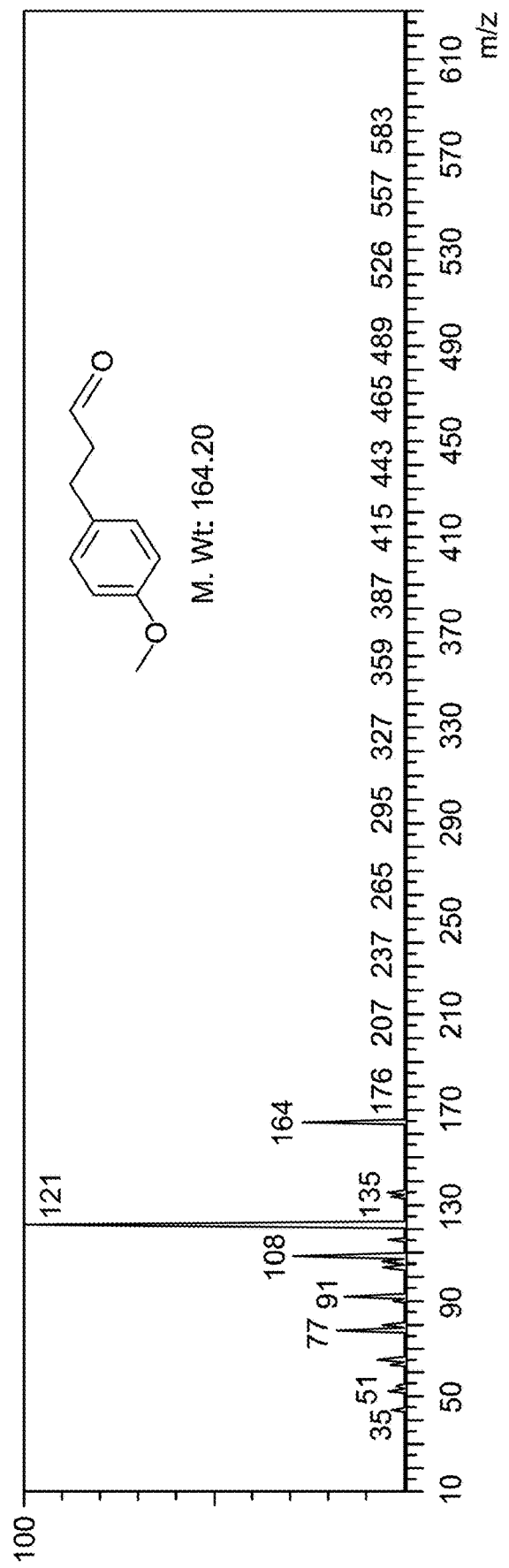
FIG. 5C illustrates GC-MS of fragments at $R_t$=18.97 of hydroformylations of 4-methoxystyrene, according to certain embodiments.
Figure 6A:
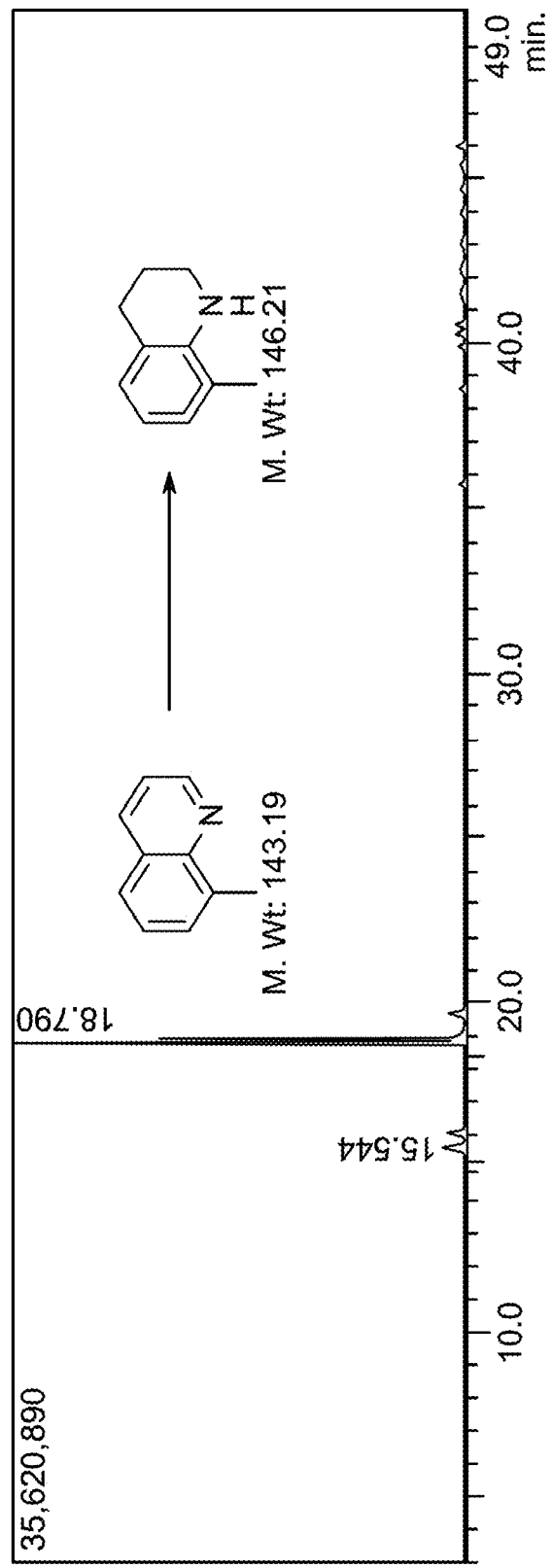
FIG. 6A illustrates GC of hydrogenations of 8-methylquinoline, according to certain embodiments.
Figure 6B:
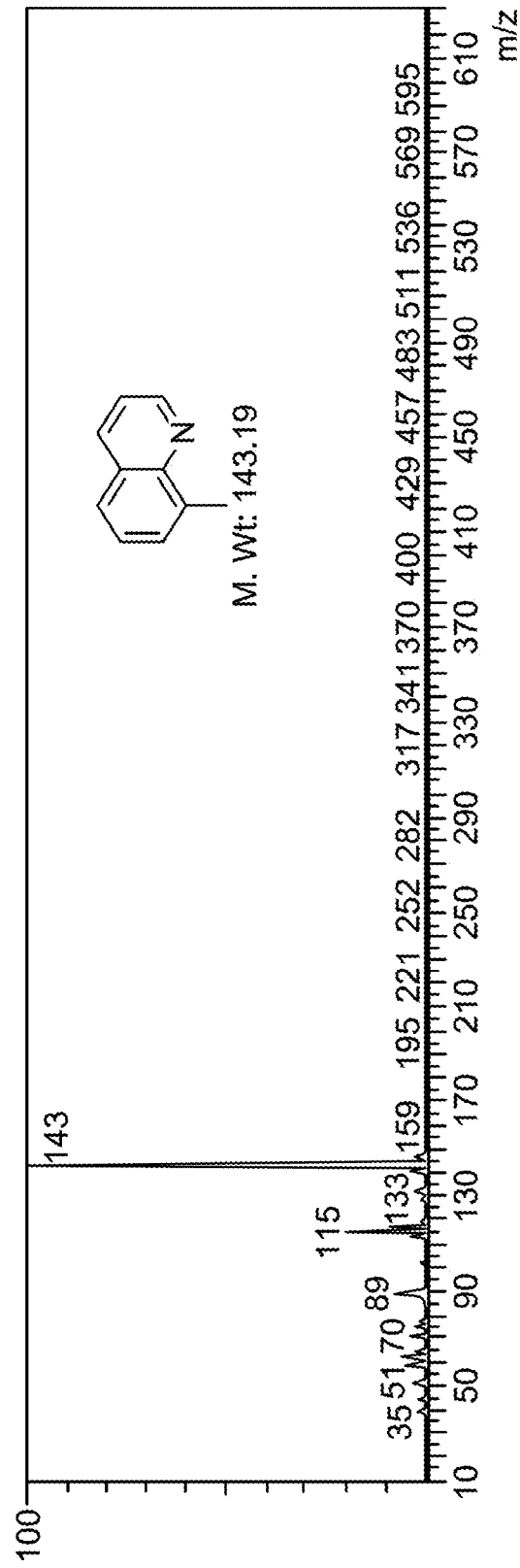
FIG. 6B illustrates GC-MS of fragments at $R_t$=15.55 of hydrogenations of 8-methylquinoline, according to certain embodiments.
Figure 6C:
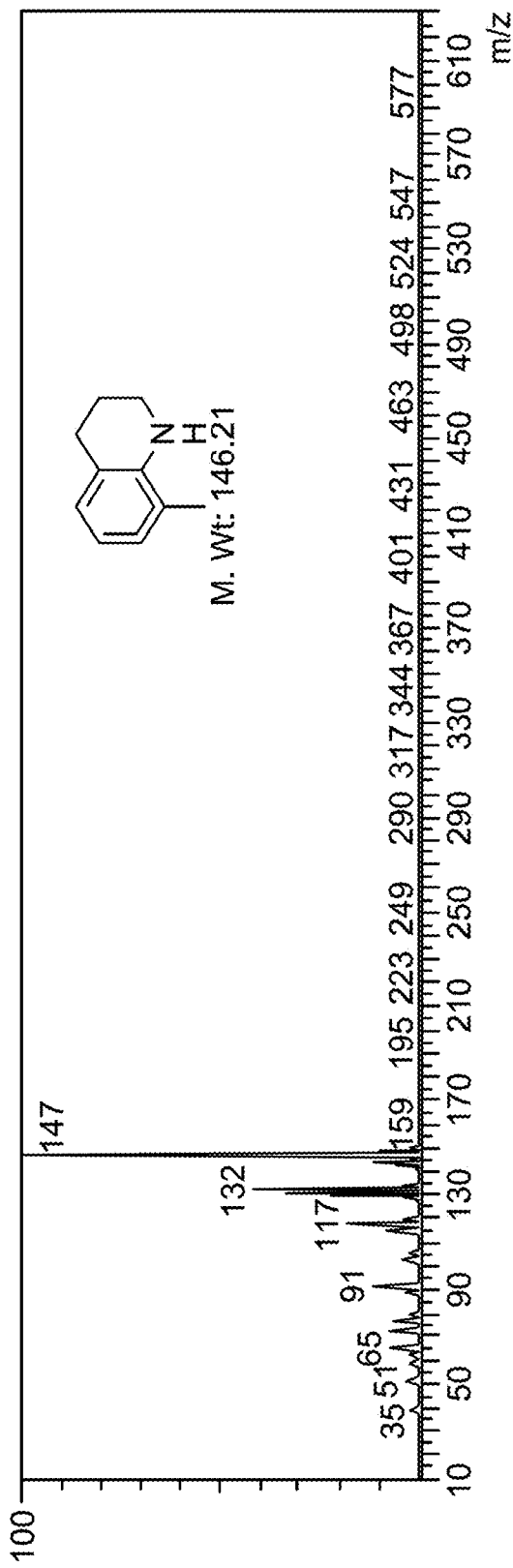
FIG. 6C illustrates GC-MS of fragments at $R_t$=18.82 of hydrogenations of 8-methylquinoline, according to certain embodiments.
Figure 7A:
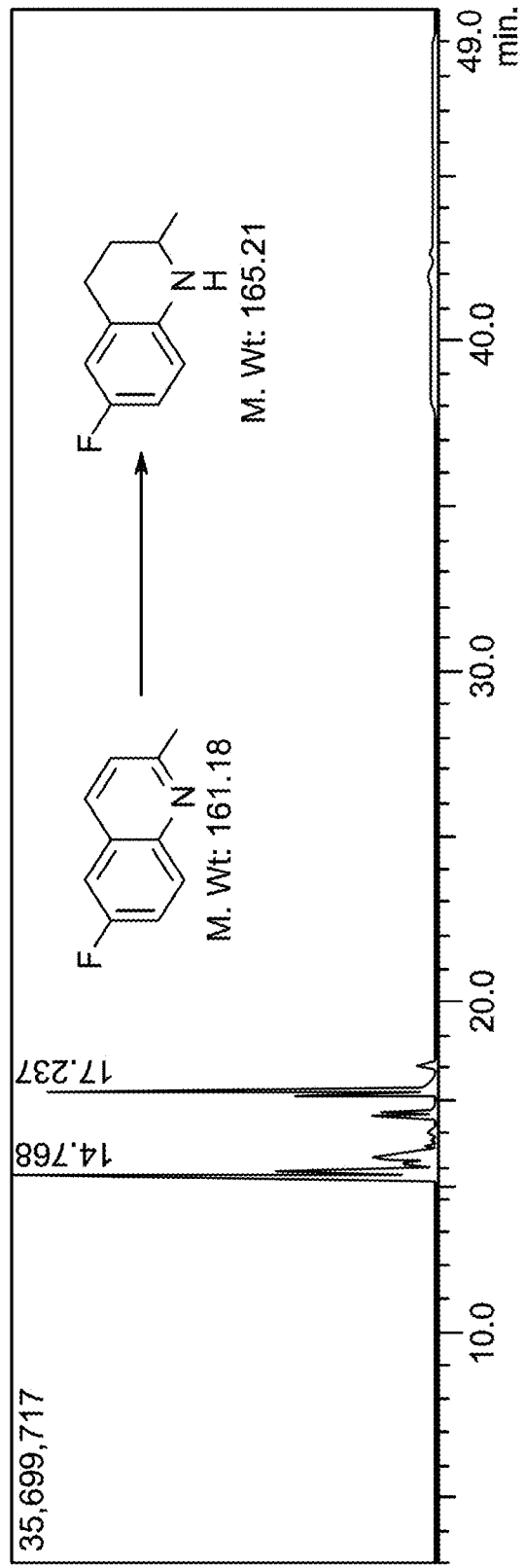
FIG. 7A illustrates GC of hydrogenations of 6-fluoro-2-methylquinoline, according to certain embodiments.
Figure 7B:
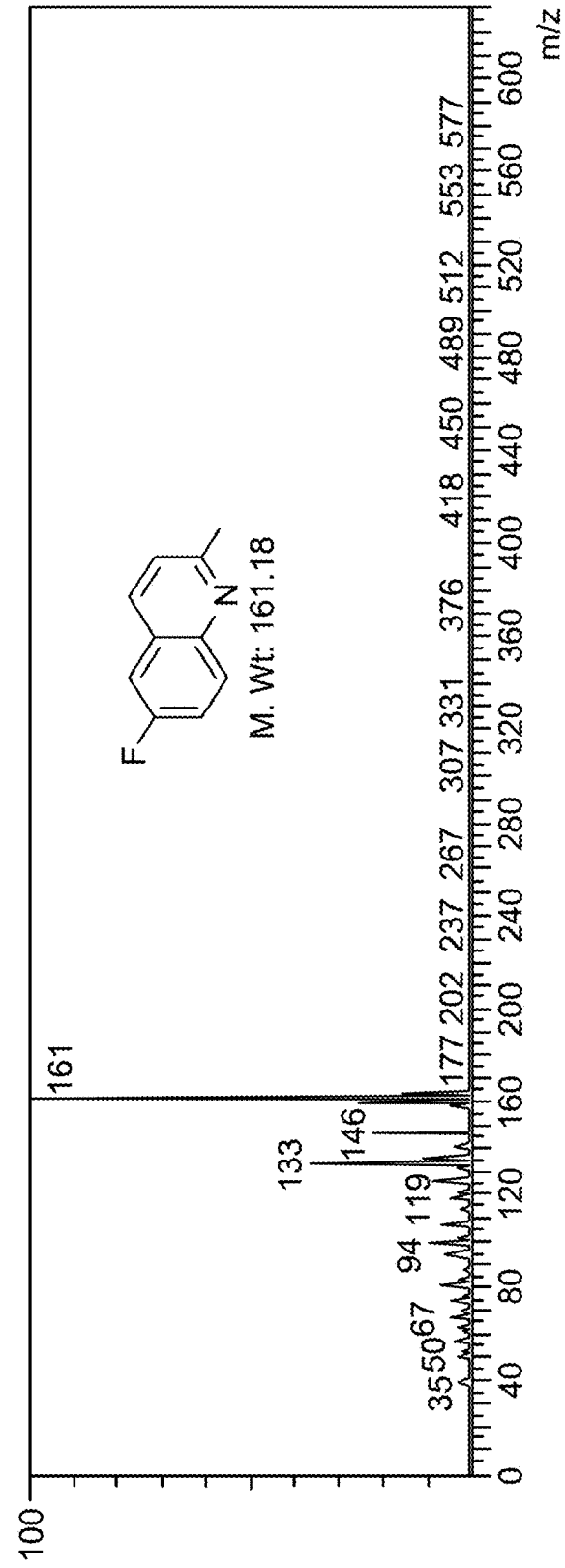
FIG. 7B illustrates GC-MS of fragments at $R_t$=14.78 of hydrogenations of 6-fluoro-2-methylquinoline, according to certain embodiments.
Figure 7C:
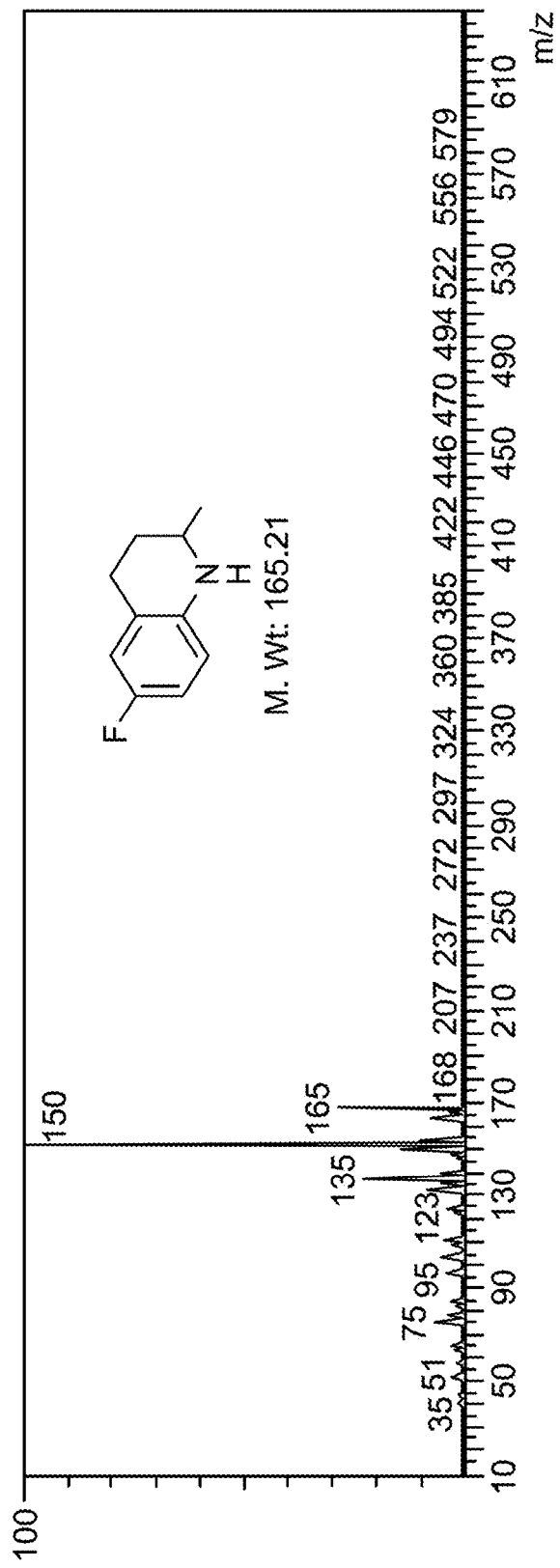
FIG. 7C illustrates GC-MS of fragments at $R_t$=17.28 of hydrogenations of 6-fluoro-2-methylquinoline, according to certain embodiments.
Figure 8A:
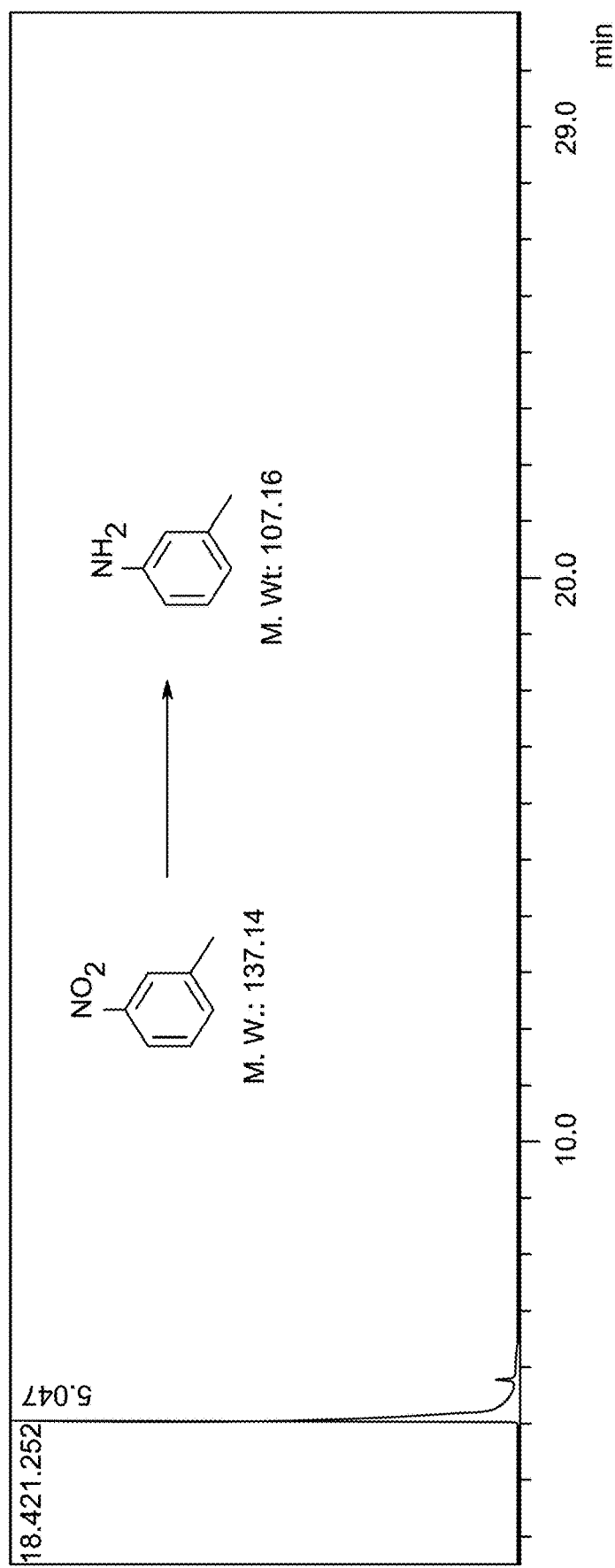
FIG. 8A illustrates GC of hydrogenations of 3-nitrotoluene, according to certain embodiments.
Figure 8B:
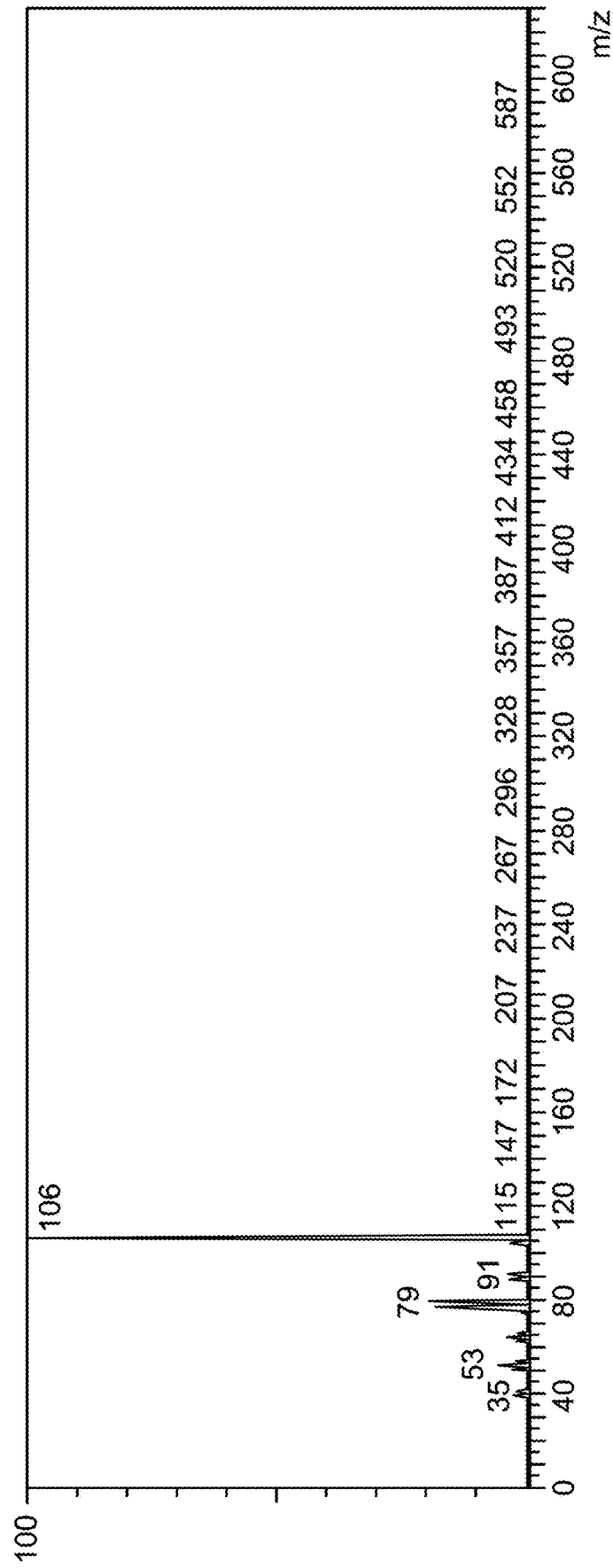
FIG. 8B illustrates GC-MS of fragments at $R_t$=5.09 of hydrogenations of 3-nitrotoluene, according to certain embodiments.
Figure 9A:
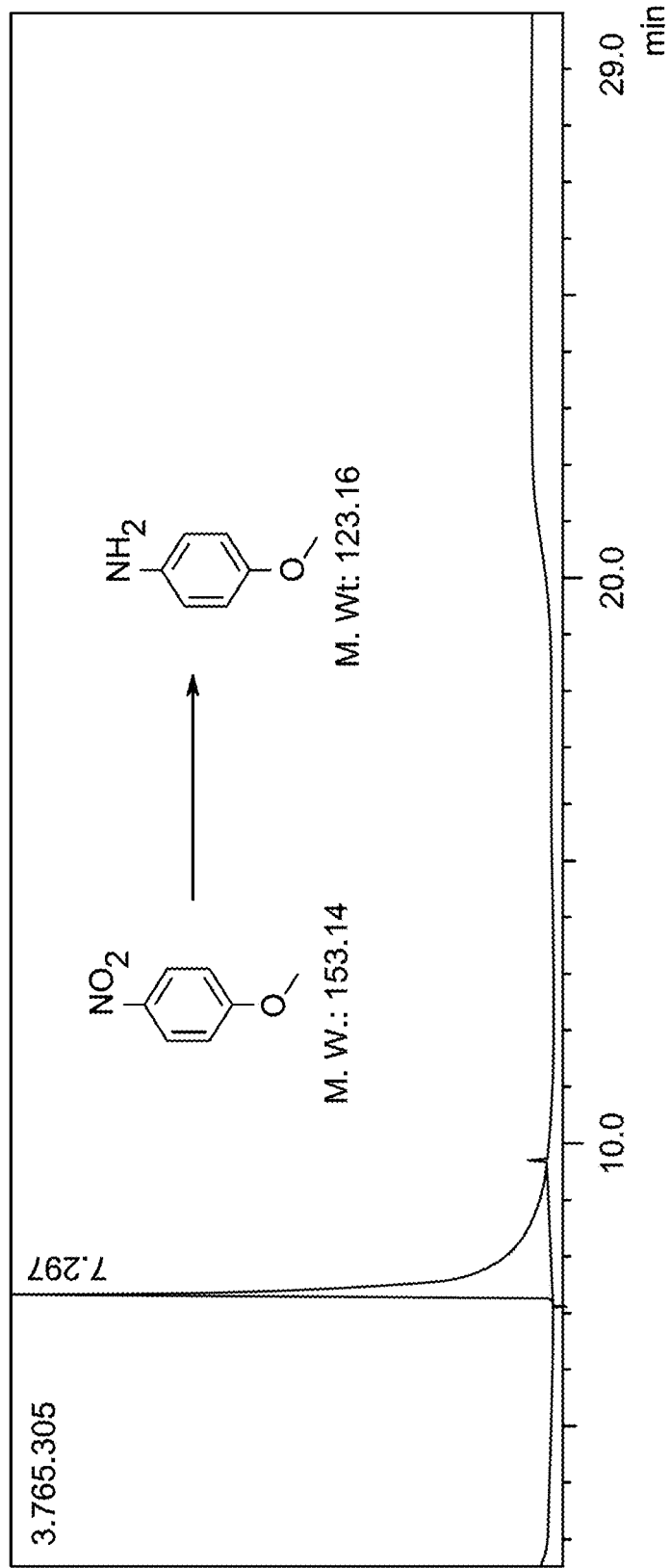
FIG. 9A illustrates GC of hydrogenations of 4-nitroanisole, according to certain embodiments.
Figure 9B:
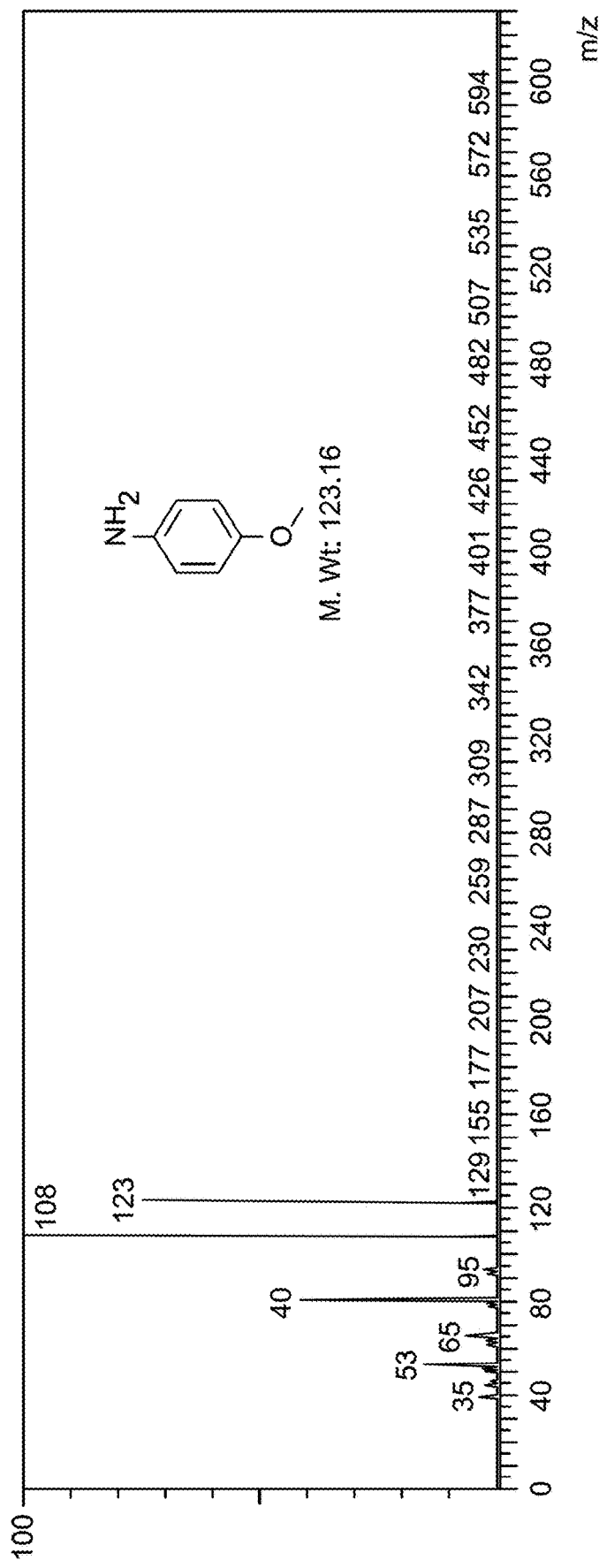
FIG. 9B illustrates GC-MS of fragments at $R_t$=7.39 of hydrogenations of 4-nitroanisole, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "hydroformylation" refers to an industrial process for the production of aldehydes from alkenes.

As used herein, the term "catalyst" refers to a substance that increases the rate and selectivity of a chemical reaction without itself undergoing any permanent chemical change.

As used herein, the term "conjugating" refers to a system of connected p orbitals with delocalized electrons in a molecule, which in general lowers the overall energy of the molecule and increases stability.

As used herein, the term "ligand" refers to an ion or molecule (functional group) that binds to a central metal atom to form a coordination complex.

As used herein, the term "anchoring" refers to a technique for fastening to concrete and similar substrates that provide more flexibility.

As used herein, the term "magnetic suspension" refers to a method by which an object is suspended with no support other than magnetic fields.

As used herein, the term "sonicating" refers to a process of applying sound energy to agitate particles or discontinuous fibers in a liquid.

As used herein, the term "nanoparticles" refers to a small particle that ranges between 1 to 100 nanometers in size.

As used herein, the term "decanting" refers to a process for the separation of mixtures of immiscible liquids or a liquid and a solid mixture such as a suspension.

The term "alkyl", as used herein, unless otherwise specified, refers to a straight, branched, or cyclic hydrocarbon fragment. Non-limiting examples of such hydrocarbon fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl. As used herein, the term "cyclic hydrocarbon" refers to a cyclized alkyl group. Exemplary cyclic hydrocarbon (i.e. cycloalkyl) groups include, but are not limited to, cyclopropyl, cyclobutyl, cyclopentyl, cyclohexyl, norbornyl, and adamantyl. Branched cycloalkyl groups, such as exemplary 1-methylcyclopropyl and 2-methycyclopropyl groups, are included in the definition of cycloalkyl as used in the present disclosure.

As used herein, the term "substituted" refers to compounds where at least one hydrogen atom is replaced with a non-hydrogen group, provided that normal valencies are maintained and that the substitution results in a stable compound. The substituents are selected from the exemplary group including, but not limited to, alkyl; alkoxy (i.e., straight or branched chain optionally substituted alkoxy having 1 to 10 carbon atoms, and includes, for example, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy); cycloalkyloxy (i.e., cyclopentyloxy, cyclohexyloxy, and cycloheptyloxy); aryloxy including an optionally substituted phenoxy; arylalkyloxy (e.g., benzyloxy); an optionally substituted hydrocarbyl; arylalkyl; hydroxy; amino; alkylamino; arylamino; arylalkylamino; disubstituted amines (e.g., in which the two amino substituents are selected from the exemplary group including, but not limited to, alkyl, aryl, or arylalkyl); arylamino; substituted arylamino; nitro; cyano; carbamyl (e.g. —$CONH_2$), substituted carbamyl (e.g. —CONHalkyl, —CONHaryl, —CONHarylalkyl or cases where there are two substituents on one nitrogen from alkyl, aryl, or arylalkyl); aryl; substituted aryl; and mixtures thereof and the like. The substituents may be either unprotected or protected as necessary.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}C$ and $^{14}C$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those skilled in the art.

According to a first aspect, the present disclosure relates to a method of making a Rh complex of ligand anchored magnetic nanoparticles catalyst for hydrogen transfer and hydroformylation reactions.

Rh-phosphine complex catalysts remain in the spotlight for heterogeneous catalysis because of the tunability of the phosphine ligand, its preferential binding with the metal, and high efficacy in conversion and selectivity [A. L. Clevenger, R. M. Stolley, J. Aderibigbe and J. Louie, Chem. Rev., 2020, 120, 6124-6196]. In addition, the introduction of a suitable functional group to the phosphine ligand assisting to anchor on a surface of nanoparticles enhances the range of applications and effortless separation of the Rh-phosphine complex catalysts.

Figure 11:
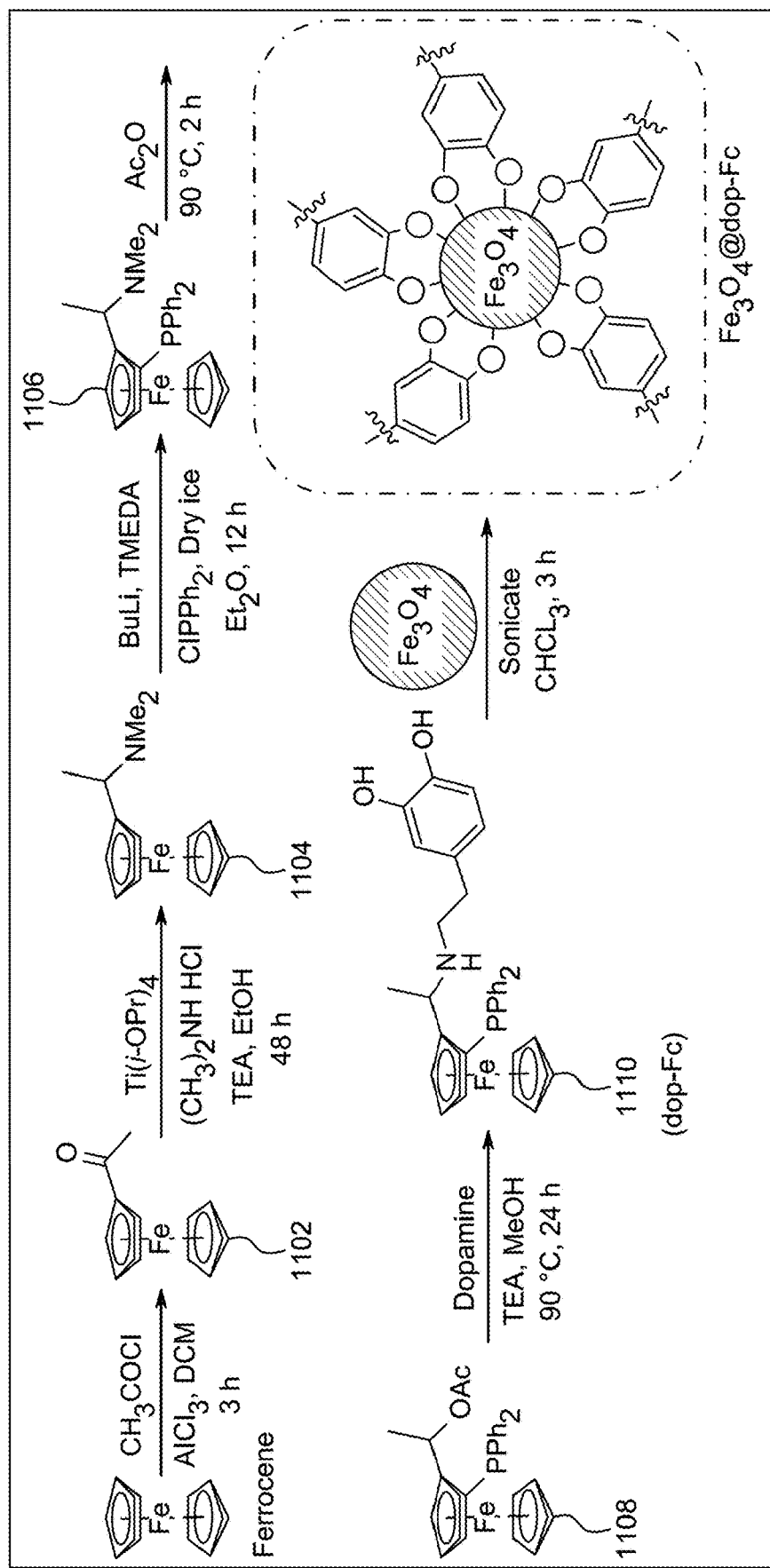
FIG. 11 illustrates a synthetic route for the formation of ultra-small superparamagnetic iron oxide nanoparticles, according to certain embodiments.

FIG. 11 is a synthetic route of making ligand anchored magnetic nanoparticles, according to one aspect of the present disclosure. The synthetic route comprises (i) acylating a ferrocene to form an acetylferrocene 1102, (ii) reductive aminating the acetylferrocene 1102 with an alkylamine compound to provide an alkylamine substituted ferrocene 1104, (iii) phosphorylating the alkylamine substituted ferrocene with an organophosphorus compound to provide an alkylamine substituted ferrocenyl phosphine 1106, (iv) acylating the alkylamine substituted ferrocenyl phosphine to provide a ferrocenyl phosphine compound 1108, (v) reductive aminating the ferrocenyl phosphine compound 1108 with an amino alcohol to provide a ligand 1110, and (vi) anchoring the ligand to a surface of magnetic nanoparticles via an oxygen atom of the hydroxyl group.

In accordance with the present invention, acetylferrocene 1102 can be prepared via acylating ferrocene in the presence of a solvent and an acylating agent. In a further embodiment, acylating ferrocene can be more efficient by adding certain Lewis acid. In some embodiments, a ferrocene maybe a substituted ferrocene, an unsubstituted ferrocene, a bridged ferrocene, an unbridged ferrocene, or any combination thereof. An acylating agent is defined as a compound that can provide an acyl group to another molecule. In some embodiments, the acylating agent is at least one selected from the group consisting of acetyl chloride, octanoyl chloride, chloroacetic anhydride, propionic anhydride, acrylic anhydride, trichloroacetic anhydride, trifluoroacetic anhydride, maleic anhydride, and acetic anhydride. In a more preferred embodiment, the acylating agent is acetyl chloride. A Lewis acid is defined as a molecule or ion which is capable of accepting an electron pair from another molecule or ion by means of coordination. In some embodiments, the Lewis acid may be at least one selected from the group consisting of $BF_3$, $TiCl_4$, $SnCl_4$, and $AlCl_3$. Solvent is defined as a substance that can dissolve other substances, resulting a solution. Exemplary solvents include, but are not limited to, water, methanol, ethanol, n-propanol, iso-propanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. In some embodiments, a molar ratio of ferrocene to acylating agent is 1:10, preferably 1:5, more preferably 1:3, and even more preferably 1:1. In some embodiments, acylating a ferrocene is carried out at a temperature in a range of from about −10 to 50° C., from about −5 to 40° C., from about 0 to 30° C., and from about 5 to 20° C. for 0.5 to 24 hours, preferably 1 to 12 hours, preferably 2 to 6 hours, and more preferably 3 hours. Other ranges are also possible.

In accordance with the present invention, alkylamine substituted ferrocene 1104 can be prepared via reductive aminating the acetylferrocene 1102 in the presence of an alkylamine compound, a solvent, a trialkyl amine and an alkoxide. In some embodiments, an alkylamine compound of formula (III) may be a primary amine, a secondary amine, a tertiary amine, or a salt thereof, a solvate thereof, or a mixture thereof, in which $R_1$, $R_2$ and $R_3$ are independently selected from the group consisting of a hydrogen, an optionally substituted alkyl, and an optionally substituted cycloalkyl. Exemplary alkylamine compounds include, but are not limited to, methylamine, ethylamine, propyleneamine, ethanolamine, isopropylamine, butylamine, isobutylamine, hexylamine, dodecylamine, oleylamine, aniline, aminopropyltrimethylsilane, aminopropyltriethylsilane, aminomorpholine, aminopropyldiethylamine, benzylamine, naphthylamine, methylethylamine, methyloctadecylamine, dimethylamine, diethanolamine, dibenzylamine, dihexylamine, dicyclohexylamine. Exemplary solvents include, but are not limited to, water, methanol, ethanol, n-propanol, iso-propanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary trialkyl amines include, but are not limited to triethylamine, tributylamine, 4-dimethylaminopyridine, benzyldimethylamine, 2,4,6-tris (dimethylaminomethyl)phenol, 1,8-diazabicyclo(5,4,0)-undecene, 4-dimethylaminopyridine and 1,8-diazabicyclo(5,4,0)-undecene. In one or more embodiments, the alkoxide is at least one or more metal alkoxides. In one or more embodiments, the metal alkoxide is selected from the group consisting of an aluminum alkoxide, a titanium alkoxide, a magnesium alkoxide, a calcium alkoxide, a strontium alkoxide, a barium alkoxide, a scandium alkoxide, an yttrium alkoxide, a zirconium alkoxide, a lanthanum alkoxide, a vanadium alkoxide, and a silicon alkoxide. In a more preferred embodiment, the metal alkoxide is titanium isopropoxide. In some embodiments, a molar ratio of the acetylferrocene 1102 to the alkylamine compound is 1:10, preferably 1:5, more preferably 1:3, and even more preferably 1:1. In some embodiments, reductive aminating the acetylferrocene 1102 is carried out at a temperature in a range of from about −10 to 50° C., from about −5 to 40° C., from about 0 to 30° C., and from about 5 to 20° C. for 12 to 96 hours, preferably 24 to 72 hours, preferably 36 to 60 hours, and more preferably 48 hours. Other ranges are also possible.

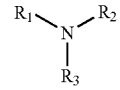

Formula [III]

In accordance with the present invention, alkylamine substituted ferrocenyl phosphine 1106 can be prepared via phosphorylating the alkylamine substituted ferrocene 1104 in the presence of an organophosphorus compound, an organoalkali-metal compound, a secondary amine and a solvent. The organophosphorus compound is acting as a phosphorylating agent that can provide a phosphorus-containing fragment or functional group to a molecule and/or an ion. In some embodiments, the phosphorus-containing fragment or functional group is at least one selected from the group consisting of phosphonium halides, quaternary phosphonium cations, alkoxyphosphonium salts, phosphates, phosphate esters, phosphate amides, phosphites, diphosphites, phosphines, phosphinites, phosphonites, phosphinates, or a salt thereof, a solvate thereof, or a mixture thereof. Exemplary organophosphorus compounds include, but are not limited to chlorodiphenylphosphine, 2-chlorophenyl phosphorodichloridate, 4-chlorophenyl phosphorodichloridate, bis(2-methoxyphenyl)phosphine, chlorodi(o-tolyl)phosphine, bis(4-methoxyphenyl)chlorophosphine, chloro(tert-butyl)phenylphosphine, bis(2,4,6-trimethylphenyl)phosphine diphenyl(trimethylsilyl)phosphine, bis(3,5-dimethylphenyl)chlorophosphine. In a more preferred embodiment, the organophosphorus compound is chlorodiphenylphosphine. Exemplary organoalkali-metal compounds include, but are not limited to methyllithium, ethyllithium, n-butyllithium, sec-butyllithium, t-butyllithium, hexyllithium, phenyllithium, stilbenelithium, dilithiomethane, dilithionaphthalene, 1,4-dilithiobutane, 1,4-dilithio-2-ethylcyclohexane and 1,3,5-trilithiobenzene. Of these organoalkali-metal compounds, organolithium compounds are preferable, and organomonolithium compounds are more preferable. The organoalkali-metal compound may be used in the form of an organoalkali-metal amide by being subjected to a reaction with a secondary amine such as dimethylamine, dibutylamine, dihexylamine, dibenzylamine, and tetramethylethylenediamine. Exemplary solvents include, but are not limited to, water, methanol, ethanol, n-propanol, iso-propanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. In some embodiments, a molar ratio of the alkylamine substituted ferrocene 1104 to the organophosphorus compound is 1:10, preferably 1:5, more preferably 1:3, and even more preferably 1:1. In some embodiments, phosphorylating alkylamine substituted ferrocene 1104 is carried out at a temperature in a range of from about −80 to 50° C., from about −50 to 30° C., from about −20 to 20° C., and from about 5 to 20° C. for 1 to 24 hours, preferably 4 to 20 hours, further preferably 8 to 16 hours, and even more preferably 12 hours. Other ranges are also possible.

In accordance with the present invention, ferrocenyl phosphine compound 1108 can be prepared via acylating the alkylamine substituted ferrocenyl phosphine 1106 in the presence of an acylating agents such as acetyl chloride, octanoyl chloride, chloroacetic anhydride, propionic anhydride, acrylic anhydride, trichloroacetic anhydride, trifluoroacetic anhydride, maleic anhydride, and acetic anhydride. In a more preferred embodiment, the acylating agent is acetic anhydride. In some embodiments, a molar ratio of the alkylamine substituted ferrocenyl phosphine 1106 to the acylating agent is 1:100, preferably 1:50, more preferably 1:30, and even more preferably 1:3. In some embodiments, acylating alkylamine substituted ferrocenyl phosphine 1106 is carried out at a temperature in a range of from about −5 to 200° C., from about 20 to 180° C., from about 80 to 160° C., and from about 120 to 140° C. for 0.5 to 12 hours, preferably 1 to 6 hours, further preferably 1.5 to 3 hours, and more preferably 2 hours. Other ranges are also possible.

In accordance with the present invention, ferrocenyl phosphine ligand 1110 can be prepared via reductive aminating the ferrocenyl phosphine compound 1108 in the presence of an amino alcohol compound, a solvent, and a trialkyl amine. In some embodiments, the amino alcohol compound of formula (IV) is selected from the group consisting of

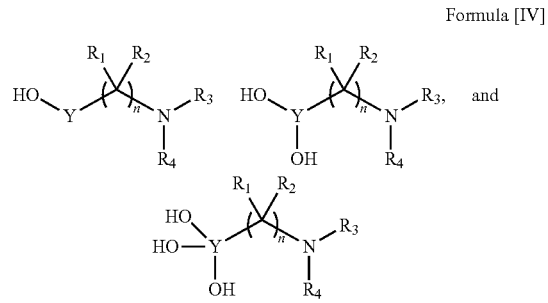

Formula [IV]

In one embodiment, the amino alcohol compound may be (i) a primary amine, a secondary amine, or a salt thereof, a solvate thereof, or a mixture thereof, and (ii) a monol, a diol, a triol, a polyol, or a salt thereof, a solvate thereof, or a mixture thereof, in which (1) $R_1$, $R_2$, $R_3$ and $R_4$ are independently selected from the group consisting of a hydrogen, an optionally substituted alkyl, an optionally substituted cycloalkyl, an optionally substituted aryl, an optionally substituted heterocycle, and an optionally substituted alkoxy group, (2) Y is independently selected from the group consisting of substituted or unsubstituted C1-C6 alkyl, substituted or unsubstituted C2-C6 alkenyl, substituted or unsubstituted C1-C6 alkynyl, substituted or unsubstituted 3- to 7-membered heterocyclyl, substituted or unsubstituted 3- to 7-membered aryl, and substituted or unsubstituted 3- to 7-membered heteroaryl, and (3) n is an integer in a range of 1-15, inclusive. Exemplary amino alcohol compounds include, but are not limited to dopamine, epinephrine, norepinephrine, 4-aminophenethyl alcohol, tyramine, octopamine, 3-methoxytyramine, L-DOPA, 4-hydroxybenzylamine, 3-hydroxybenzylamine, 3,4-dihydroxybenzylamine. In a more preferred embodiment, the amino alcohol compound is dopamine. Exemplary solvents include, but are not limited to, water, methanol, ethanol, n-propanol, iso-propanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. In some embodiments, the trialkyl amine of formula (III) may be a salt thereof, a solvate thereof, or a mixture thereof, in which $R_1$, $R_2$ and $R_3$ are independently selected from the group consisting of an optionally substituted alkyl, and an optionally substituted cycloalkyl. Exemplary trialkyl amine include, but are not limited to, triethylamine, tributylamine, 4-dimethylaminopyridine, benzyldimethylamine, 2,4,6,-tris(dimethylaminomethyl)phenol, 1,8-diazabicyclo(5,4,0)-undecene, 4-dimethylaminopyridine and 1,8-diazabicyclo(5,4,0)-undecene. In a more preferred embodiment, the trialkyl amine is triethylamine. In some embodiments, a molar ratio of the ferrocenyl phosphine compound 1108 to the amino alcohol compound is 1:10, preferably 1:5, more preferably 1:3, and even more preferably 1:1. In some embodiments, reductive aminating the ferrocenyl phosphine compound 1108 is carried out at a temperature in a range of from about 0 to 200° C., from about 25 to 150° C., from about 60 to 100° C., and from about 85 to 95° C. for 1 to 48 hours, preferably 12 to 36 hours, further preferably 18 to 30 hours, and more preferably 24 hours. Other ranges are also possible.

Referring to FIG. 1, a schematic flow diagram of a method 100 making a magnetic-nanoparticle-supported catalyst is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

Figure 12A:
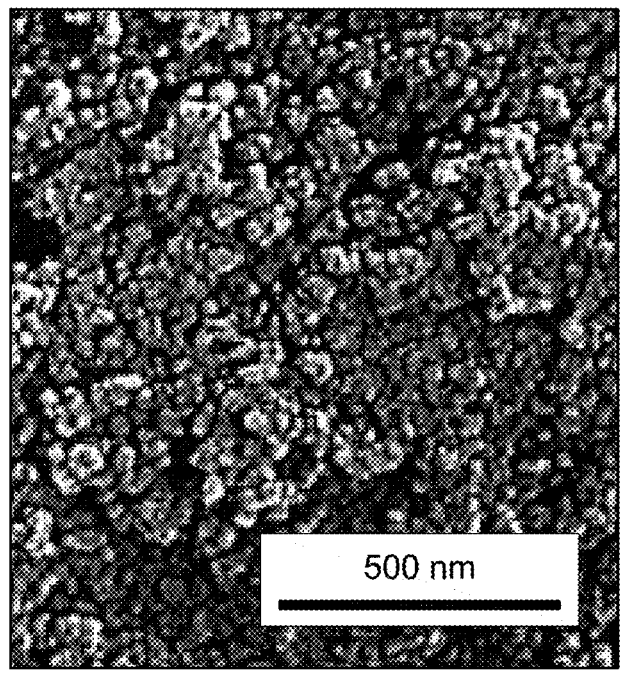
FIG. 12A illustrates a scanning electron microscope (SEM) characterization data of pure magnetite ($Fe_3O_4$), according to certain embodiments.
Figure 12B:
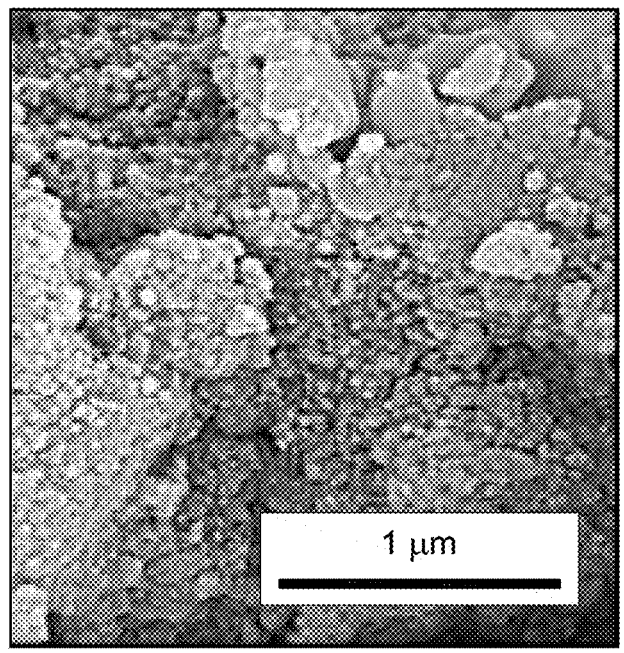
FIG. 12B illustrates a SEM characterization data of a Rh complex of magnetic-$Fe_3O_4$-nanoparticle-supported ferrocenyl phosphine catalyst ($Fe_3O_4$@dop-Fc-Rh), according to certain embodiments.

In step 102, the method 100 includes reacting a ferrocenyl phosphine compound with an amino alcohol compound to form a ligand having a phosphine group, an amine group and at least one hydroxyl group. In some embodiments, the ferrocenyl phosphine compound is diphenylphosphino-ferrocenylethyl amine (PPFA), the amino alcohol compound is dopamine hydrochloride, and the ligand has at least one phosphine group, at least one amine group and at least one hydroxyl group. In alternate embodiments, the ferrocenyl phosphine compound is N,N-dimethylferrocenyl-ethyl-amine (FA) 1-[2-dipeniylphosphinoferrocenyl](N-methyl)(N-diphenylphosphino)ethylamine (Bophoz), N,N-dim-ethyl-1-[-1',2bis(diphenylphosphino)ferrocenyl]-ethyl-amine (BPPFA), or 1-[1',2-bis(diphenylphosphino)ferrocenyl]ethyl acetate (BPPFA-OAc). In some embodiments, the amino alcohol is dopamine, epinephrine, or norepinephrine. In some embodiments, the catalyst has a singular phosphine group attached to a cyclopentadienyl (Cp) ring of a ferrocene unit within the catalyst. In some embodiments, the catalyst has at least one amino group and at least hydroxyl group within the catalyst. In another embodiment, the catalyst has a particle size in a longest dimension of from 5 nanometers (nm) to 10 nm, preferably 5.25 nm to 9.75 nm, preferably 5.5 nm to 9.5 nm, preferably 5.75 nm to 9.25 nm, preferably 6 nm to 9 nm, preferably 6.25 nm to 8.75 nm, preferably 6.5 nm to 8.5 nm, preferably 6.75 nm to 8.25 nm, preferably 7 nm to 8 nm, preferably 7.25 nm to 7.75 nm, or 7.5 nm. In some embodiments, individual crystals of magnetite ($Fe_3O_4$) within the catalyst have an interplanar distance of from 0.2 nm to 0.25 nm between the individual crystals, preferably 0.2025 nm to 0.2475 nm, preferably 0.205 nm to 0.245 nm, preferably 0.2075 nm to 0.02425 nm, preferably 0.21 nm to 0.24 nm, preferably 0.2125 nm to 0.2375 nm, preferably 0.215 nm to 0.235 nm, preferably 0.2175 nm to 0.2325 nm, preferably 0.22 nm to 0.23 nm, preferably 0.2225 nm to 0.2275 nm, or 0.225 nm. As depicted in FIG. 12A, the interplanar spacing refers to the lateral distance between adjacent particles that are not physically touching. In some embodiments, the individual crystals of magnetite are uniformly distributed throughout the catalyst. As depicted in FIG. 12B, the magnetite crystals are bulky formations scattered rather homogenously throughout the geography of the catalyst with an even distribution of bulk formations displayed laterally along the catalyst surface. The crystals may be uniform. As used herein, the term "uniform" refers to no more than 10%, no more than 5%, no more than 4%, no more than 3%, no more than 2%, or no more than 1% of the distribution of the nanoparticles having a different shape. For example, the crystals are uniform and have no more than 1% of nanoparticles in an oblong shape. In some embodiments, the crystals may be non-uniform. As used herein, the term "non-uniform" refers to more than 10% of the distribution of the crystals having a different shape. In some embodiments, the catalyst has a crystalline morphology. Also depicted in FIG. 12B and FIG. 13C, the catalyst shows a crystalline pattern, or a highly ordered, three-dimensional lattice arrangement in a structural pattern. The catalyst may be crystalline, polycrystalline, nanocrystalline, or amorphous. Preferably, the catalyst is nanocrystalline. The catalyst may have multiple phases or a single phase. The catalyst may have a microstrain in a range of 0.1-1%, 0.2-0.8%, or 0.3-0.5%. As used herein, the term "microstrain" refers to the root mean square of the variations in the lattice parameters across the individual nanocrystallites.

At step 104, the method 100 includes anchoring the ligand to a surface of magnetic nanoparticles via an oxygen atom of the hydroxyl group to form a ligand complex. In some embodiments, the ligand complex is magnetic-$Fe_3O_4$-nanoparticle-supported dopamine ferrocenyl phosphine. In some embodiments, the step 104 involves (i) sonicating the magnetic nanoparticles to form a suspension, (ii) mixing the ligand and the suspension, and sonicating to form a ligand anchored magnetic suspension, and (iii) collecting the ligand anchored magnetic nanoparticles within the ligand anchored magnetic suspension with a magnet and decanting the magnetic suspension. In a preferred embodiment, the reaction mixture is sonicated at a range of 20-120 kHz, 30-90 kHz, or 40-80 kHz. In some embodiments, the sonication duration is about 3-20 min, about 5-15 min, or about 8-12 min. In some embodiments, the sonication duration is about 1-5 hours, preferably 2-4 hours, or 3 hours. The nanoparticles may be suspended in a solvent selected from the group consisting of water, methanol, ethanol, n-propanol, iso-propanol, n-butanol, iso-butanol, tert-butanol, ethyl acetate, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, chloroform, and mixtures thereof in suitable proportions. Preferably, the solvent is chloroform. An amount of the nanoparticles in the suspension may be in a range of 1-500 mg/ml of solvent, 10-300 mg/ml, or 100-200 mg/ml. The ligand may be mixed with the suspension of the nanoparticles in an inert atmosphere. Preferably, the inert atmosphere is argon. In some embodiments, the magnetic nanoparticles are superparamagnetic iron oxide nanoparticles (SPIONs), in the form of spheres. The nanoparticle may preferably be spherical or substantially spherical (e.g., oval or oblong shape). In other embodiments, the nanoparticle can be of any shape that provides desired photocatalytic activity. In some embodiments, the nanoparticle is in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface). In some embodiments, the magnetic-nanoparticle-supported catalyst has 0.2 to 0.3 mmol of Rh per gram of the catalyst, preferably 0.21 to 0.29 mmol of Rh, preferably 0.22 to 0.28 mmol of Rh, preferably 0.23 to 0.27 mmol of Rh, preferably 0.24 mmol of Rh, or 0.25 mmol of Rh per gram of the magnetic-nanoparticle-supported catalyst. In some embodiments, individual crystals of magnetite ($Fe_3O_4$) within the hydroformylation catalyst have an interplanar distance of from 0.2 nm to 0.25 nm between the individual crystals, preferably 0.2025 nm to 0.2475 nm, preferably 0.205 nm to 0.245 nm, preferably 0.2075 nm to 0.02425 nm, preferably 0.21 nm to 0.24 nm, preferably 0.2125 nm to 0.2375 nm, preferably 0.215 nm to 0.235 nm, preferably 0.2175 nm to 0.2325 nm, preferably 0.22 nm to 0.23 nm, preferably 0.2225 nm to 0.2275 nm, or 0.225 nm. In another embodiment, the individual crystals of magnetite are uniformly distributed throughout the hydroformylation catalyst. Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value |$\mu$|). The CV or RSD is widely used to express precision and repeatability. It shows the extent of variability in relation to the mean of a population. The nanoparticles having a narrow size dispersion, i.e. monodispersity, is preferred. As used herein, "monodisperse", "monodispersed" and/or "monodispersity" refers to nanoparticles having a CV or RSD of less than 25%, preferably less than 20%. In some embodiments, the nanoparticles may be monodisperse with a coefficient of variation or relative standard deviation (ratio of the particle size standard deviation to the particle size mean) of less than 15%, less than 12%, less than 10%, less than 9%, less than 8%, less than 7%, less than 6%, less than 5%, or preferably less than 2%, In one embodiment, the nanoparticles are monodisperse and have a particle diameter distribution in a range of 75% of the average particle diameter to 125% of the average particle diameter, 80-120% 85-115%, 86-114%, 87-113%, 88-112%, 89-111%, 90-110%, or preferably 95-105% of the average particle diameter. The reaction mixture is preferably heterogeneous and comprises suspended catalyst particles in the liquid reaction mixture.

At step 106, the method 100 includes combining the ligand complex with a metal precursor comprising Rh to bind the metal precursor with the ligand complex and form the magnetic-particle-supported catalyst. In some embodiments, the magnetic-nanoparticle-supported catalyst is a Rh complex of magnetic-$Fe_3O_4$-nanoparticle-supported ferrocenyl phosphine catalyst. In some embodiments, the catalytic center is nickel, iron, lead or ruthenium. In alternate embodiments, the catalytic center is a binuclear metal complex, a mononuclear metal complex, or a metal salt of ruthenium, iridium, palladium, or rhodium. Exemplary metal precursors include, but are not limited to allylpalladium(II) chloride dimer, (2-methylallyl)palladium(II) chloride dimer, palladium($\pi$-cinnamyl) chloride dimer, (2-butenyl)chloropalladium dimer, palladium(II) chloride, palladium(II) bromide, palladium(II) iodide, bis(benzonitrile) palladium(II) chloride, bis(acetonitrile)palladium(II) chloride, palladium(II) acetate, dichloro(mesitylene)ruthenium(II) dimer, bis(2-methylallyl)(1,5-cyclooctadiene)ruthenium(II), bis(1,5-cyclooctadiene)iridium(I) tetrafluoroborate, bis(1,5-cyclooctadiene)diiridium(I) dichloride, bicyclo[2.2.1]hepta-2,5-diene-rhodium(I)-chloride-dimer, chloro(1,5-cyclooctadiene)rhodium(I)-dimer, hydroxy(cyclooctadie-ne)rhodium(I)-dimer, chlorobis(cyclooctene)rhodium(I)-dimer, methoxy-(cyclooctadiene)-rhodium-(I)-dimer, chloro(1,5-hexadiene)rhodium(I)-dimer, bis(1,5-cyclooctadiene)-rhodium(I)-tetrafluoroborate, bis(1,5-cyclooctadiene)rhodium(I)tetrakis[bis(3,5-trifluoro-methyl)phenyl]-borate, bis(acetonitrile)(1,5-cyclooctadiene)rhodium(I)tetrafluoroborate, bis(1,5-cyclooctadiene)-rhodium(I)-hexafluoroantimonate, and bis(norbornadiene)rhodium(I) trifluoro-methanesulfonate.

In some embodiments, hydroformylating a terminal olefin in the presence of the magnetic-nanoparticle-supported catalyst and a syngas mixture comprising CO and $H_2$ to form an aldehyde, in which a molar ratio of CO to $H_2$ in the syngas mixture is in a range of 10:1 to 1:10, and hydroformylating is carried out under a gas pressure in a range of 20 to 100 bar. A molar ratio of the carbon monoxide gas to the hydrogen gas may be in a range of 1:3 to 3:1, 1:2 to 2:1, and about 1:1. Preferably, syngas is used. The carbon monoxide gas may be replaced by aldehydes, higher alcohols (e.g., cinnamyl alcohol, polyols), and metal carbonyls (e.g., $Mo(CO)_6$ and $W(CO)_6$) to reduce the use of toxic and flammable carbon monoxide gas, and the hydroformylation may still proceed as intended. The hydroformylation reaction may be carried out under a pressure in a range of 5 to 150 bar, preferably 20 to 100 bar, or more preferably 40 to 60 bar for 5-20 hours, preferably 8-16 hours, or more preferably 10-14 hours at a temperature in a range of 30-90° C., preferably 40-80° C., or more preferably 45-70° C. In some embodiments, the hydroformylating forms a mixture comprising branched aldehydes and linear aldehydes, in which a ratio of the branched aldehydes to linear aldehydes is in a range of 1:1 to 20:1. In some embodiments, the ratio of the branched aldehyde to the linear aldehyde is in a range of 1:20 to 50:1, preferably 1:10 to 20:1, or more preferably 1:1 to 20:1. The ratio of the branched aldehydes to linear aldehydes may be a molar ratio, a weight ratio, or a volume ratio. In some embodiments, the mixture comprising branched and linear aldehydes formed in hydroformylating is mixed in the reaction vessel and the mixture is optionally agitated. After which, the reaction vessel is purged with the carbon monoxide and hydrogen gases for 1-10 times, 2-8 times, or 3-6 times. The progress of each reaction may be monitored by methods known to those skilled in the art, such as thin layer chromatography, gas chromatography, nuclear magnetic resonance, infrared spectroscopy, and high-pressure liquid chromatography combined with ultraviolet detection or mass spectroscopy under an inert atmosphere. The reaction mixture may be optionally agitated. The conversion of the reactant to the aldehyde may be more than 80%, more than 90%, more than 95%, or more than 99%, based on the number of moles of the reactant. The aldehyde may be linear or branched (see Table 1 for examples of linear and branched aldehydes). In most embodiments, a hydrogenated by-product was not observed in the reaction mixture. For example, there may be less than 0.1 wt %, less than 0.05 wt %, or less than 0.01 wt % of the hydrogenated by-product. In some embodiments, the amount of the magnetic-nanoparticle-supported catalyst used in the hydroformylating is from 1 to 20 milligrams (mg) per millimole (mmol) of the terminal olefin, preferably 2 to 18 mg, preferably 4 to 16 mg, preferably 6 to 14 mg, more preferably 8 to 12 mg, or 10 mg per mmol of the terminal olefin. In some embodiments, a concentration of the terminal olefin used in the hydroformylating is from 0.01 to 0.5 millimoles (mmol) per milliliter (ml) of a solvent used in the hydroformylating, preferably 0.02 to 0.4 mmol, preferably 0.04 to 0.3 mmol, preferably 0.08 to 0.3 mmol, or 0.1 mmol per ml of the solvent.

In some embodiments, the method further includes hydrogenating one or more nitroarenes and/or N-heteroarenes in the presence of the magnetic-nanoparticle-supported catalyst with a mixture of water, and tetrahydroxydiboron to form one or more aminoarenes and/or hydrogenated N-heteroarenes. A molar ratio of the nitroarenes and/or N-heteroarenes to tetrahydroxydiboron may be 1:20, preferably 1:10, more preferably 1:5, and even more preferably 1:2. The tetrahydroxydiboron may be replaced by ammonium formate, sodium borohydride, formic acid, ethylene diamine tetraacetic acid, lactic acid, and hydrogen transfer reactions may still proceed as intended. The hydrogen transfer reaction may be carried out at an agitation speed in a range of 100 to 1000 revolutions per minute (rpm), preferably 150 to 500 rpm, or more preferably 200 to 300 rpm for 5-120 minutes, preferably 10-60 minutes, or more preferably 20-40 minutes at a temperature in a range of 20-200° C., preferably 40-150° C., further preferably 60-100° C. or more preferably 80° C. in an inert atmosphere. In some embodiments, the hydrogen transfer reaction forms one or more aminoarenes and/or hydrogenated N-heteroarenes. The progress of each reaction may be monitored by methods known to those skilled in the art, such as thin layer chromatography, gas chromatography, nuclear magnetic resonance, infrared spectroscopy, and high-pressure liquid chromatography combined with ultraviolet detection or mass spectroscopy under an inert atmosphere. The conversion of the nitroarenes and/or N-heteroarenes to the aminoarenes and/or hydrogenated N-heteroarenes may be more than 80%, more than 90%, more than 95%, or more than 99%, based on the number of moles of reactants. The formed aminoarenes may be substituted or unsubstituted (see Table 2 for examples of aminoarenes). In most embodiments, a hydrogenated by-product was not observed in the reaction mixture. For example, there may be less than 50 wt %, less than 10 wt %, less than 1 wt %, or less than 0.01 wt % of the hydrogenated by-product. In some embodiments, the amount of the magnetic-nanoparticle-supported catalyst used in the hydrogenating is from 1 to 100 milligrams (mg) per millimole (mmol) of the nitroarenes and/or N-heteroarenes, preferably 5 to 80 mg, preferably 10 to 40 mg, further preferably 15 to 25 mg, or more preferably 20 mg per mmol of the nitroarenes and/or N-heteroarenes. In some embodiments, a concentration of the nitroarenes and/or N-heteroarenes used in the hydrogenating is from 0.005 to 0.5 millimoles (mmol) per milliliter (ml) of a solvent used in the hydrogenating, preferably 0.01 to 0.4 mmol, preferably 0.02 to 0.2 mmol, further preferably 0.04 to 0.1 mmol, or more preferably 0.05 mmol per ml of the solvent.

In other embodiments, the method also involves hydrogenating substituted and/or unsubstituted quinolines in the presence of the magnetic-nanoparticle-supported catalyst with a mixture of water and tetrahydroxydiboron to form substituted and/or unsubstituted tetrahydroquinolines. A molar ratio of the quinolines to tetrahydroxydiboron may be 1:20, preferably 1:10, more preferably 1:5, and even more preferably 1:2. The tetrahydroxydiboron may be replaced by ammonium formate, sodium borohydride, formic acid, ethylene diamine tetraacetic acid, lactic acid, and hydrogen transfer reactions may still proceed as intended. The hydrogen transfer reaction may be carried out at an agitation speed in a range of 100 to 1000 rpm, preferably 150 to 500 rpm, or more preferably 200 to 300 rpm for 5-120 minutes, preferably 30-90 minutes, or more preferably 50-70 minutes at a temperature in a range of 20-200° C., preferably 50-150° C., more preferably 80-100° C. or more preferably 90° C. in an inert atmosphere. In some embodiments, the hydrogen transfer reaction forms one or more substituted and/or unsubstituted tetrahydroquinolines. The progress of each reaction may be monitored by methods known to those skilled in the art, such as thin layer chromatography, gas chromatography, nuclear magnetic resonance, infrared spectroscopy, and high-pressure liquid chromatography combined with ultraviolet detection or mass spectroscopy under an inert atmosphere. The conversion of the substituted and/or unsubstituted quinolines to the substituted and/or unsubstituted tetrahydroquinolines may be more than 10%, more than 50%, more than 90%, more than 95%, or more than 99%, based on the number of moles of reactants. The formed tetrahydroquinolines may be substituted or unsubstituted (see Table 3 for examples of tetrahydroquinolines). In most embodiments, a hydrogenated by-product was not observed in the reaction mixture. For example, there may be less than 0.1 wt %, less than 0.05 wt %, or less than 0.01 wt % of the hydrogenated by-product. In some embodiments, the amount of the magnetic-nanoparticle-supported catalyst used in the hydrogenating is from 1 to 100 milligrams (mg) per millimole (mmol) of the substituted and/or unsubstituted quinolines, preferably 5 to 80 mg, preferably 10 to 40 mg, preferably 15 to 25 mg, or more preferably 20 mg per mmol of the substituted and/or unsubstituted quinolines. In some embodiments, a concentration of the substituted and/or unsubstituted quinolines used in the hydrogenating is from 0.005 to 0.5 millimoles (mmol) per milliliter (ml) of a solvent used in the hydrogenating, preferably 0.01 to 0.4 mmol, preferably 0.02 to 0.2 mmol, preferably 0.04 to 0.1 mmol, or more preferably 0.05 mmol per ml of the solvent.

In some embodiments, the magnetic-nanoparticle-supported catalyst has a particle size in a longest dimension of 5 nm to 10 nm, preferably 5.25 nm to 9.75 nm, preferably 5.5 nm to 9.5 nm, preferably 5.75 nm to 9.25 nm, preferably 6 nm to 9 nm, preferably 6.25 nm to 8.75 nm, preferably 6.5 nm to 8.5 nm, preferably 6.75 nm to 8.25 nm, preferably 7 nm to 8 nm, preferably 7.25 nm to 7.75 nm, or 7.5 nm. In some embodiments, the magnetic-nanoparticle-supported catalyst has a crystalline morphology. The catalyst may be crystalline, polycrystalline, nanocrystalline, or amorphous. Preferably, the catalyst is nanocrystalline. The catalyst may have multiple phases or a single phase. The catalyst may have a microstrain in a range of 0.1-1%, 0.2-0.8%, or 0.3-0.5%.

In another embodiment, a Rh complex of magnetic-$Fe_3O_4$-nanoparticle-supported ferrocenyl phosphine catalyst was prepared by the method, having a formula (I) as shown below

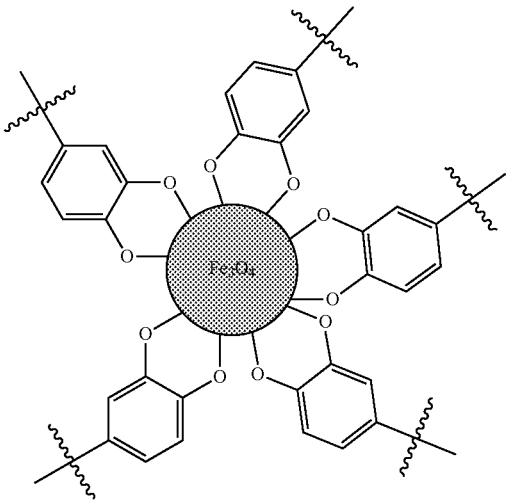

Formula [I]

In which [−ξ−] represents a formula of [II]

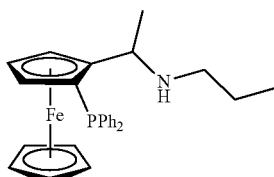

Formula [II]

The catalyst may be useful for reactions such as Mizoroki-Heck reaction, Mizoroki-Heck-Matsuda, Sonogashira, Kumada, Negishi, Stille, Suzuki, Hiyama, Buchwald-Hartwig, hydroformylation, hydrogenation, allylic alkylation, Michael addition, cyclopropanation, hydroboration, olefin isomerization and hydroacylation, hydrosilylation and silylformylation, cycloisomerization and cyclotrimerization, Alder-ene, allylic substitution, carbocyclizations, carbon-hydrogen insertion, oxidative amination, ylide rearrangements, and 1,3-dipolar cycloadditions. Preferably, it catalyzes reactions such as hydrogen transfer and hydroformylation reactions. The amount of catalyst may be in a range of 0.1-30 mol %, 0.5-20 mol %, or 1-10 mol %, based on the number of moles of the optionally selected substrates. Higher catalyst loadings (e.g., up to 20 mol %, 30 mol %, 40 mol %, 80 mol %) may be used and the method will still proceed as intended.

In some embodiments, the Rh complex of magnetic-$Fe_3O_4$-nanoparticle-supported ferrocenyl phosphine catalyst has a particle size in a longest dimension of 5 nm to 10 nm, preferably 5.5 nm to 9.5 nm, preferably 6 nm to 9 nm, preferably 6.5 nm to 8.5 nm, preferably 7 nm to 8 nm, or 7.5 nm. In some embodiments, individual crystals of magnetite within the Rh complex of magnetic-$Fe_3O_4$-nanoparticle-supported ferrocenyl phosphine catalyst have an interplanar distance of from 0.2 nm to 0.25 nm between the individual crystals, preferably 0.21 nm to 0.24 nm, preferably 0.22 nm to 0.23 nm, or 0.225 nm. In another embodiment, individual crystals of magnetite are uniformly distributed throughout the catalyst. In a further embodiment, the Rh complex of magnetic-$Fe_3O_4$-nanoparticle-supported ferrocenyl phosphine catalyst has a crystalline morphology.

The crystalline structure of the Rh complex of magnetic-$Fe_3O_4$-nanoparticle-supported ferrocenyl phosphine catalyst is characterized by X-ray diffraction (XRD). In some embodiments, X-ray diffraction (XRD) patterns are recorded on a Rigaku model Ultima-IV diffractometer employing Cu-Kα radiation (λ=1.5406 Å) at 40 kilo Volts (kV) and 25 milliamperes (mA) over a 2θ range between 20 and 80°.

Figure 12C:
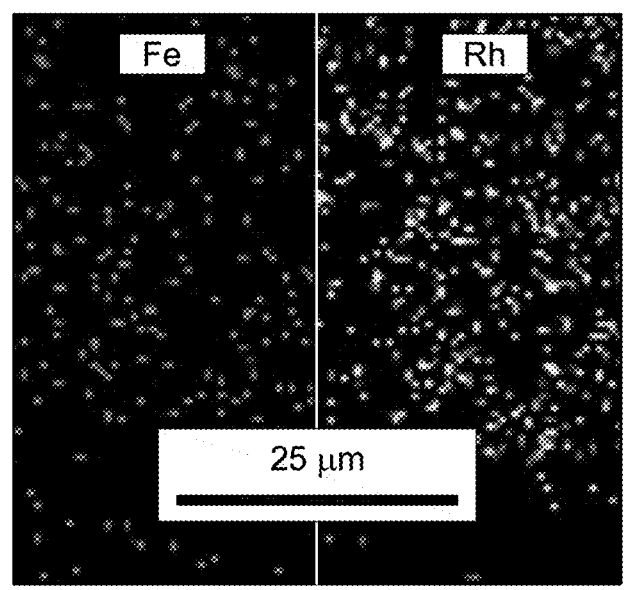
FIG. 12C illustrates a SEM characterization data of confined area elemental mapping of Fe and Rh, according to certain embodiments.
Figure 12D:
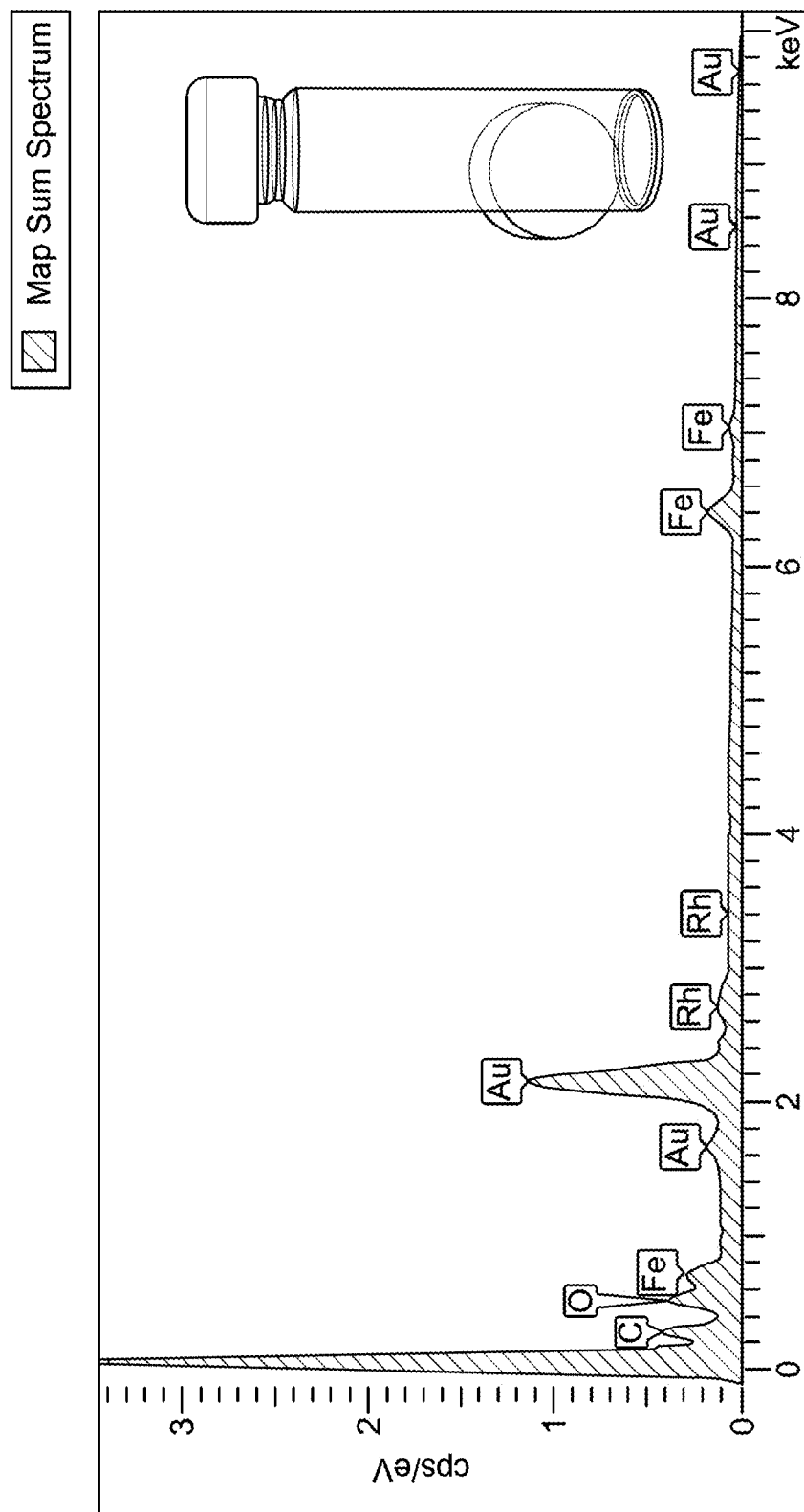
FIG. 12D illustrates a SEM characterization data of an electrodynamic suspension (EDS) with inset magnetic nanoparticles with a simple magnet, according to certain embodiments.
Figure 12E:
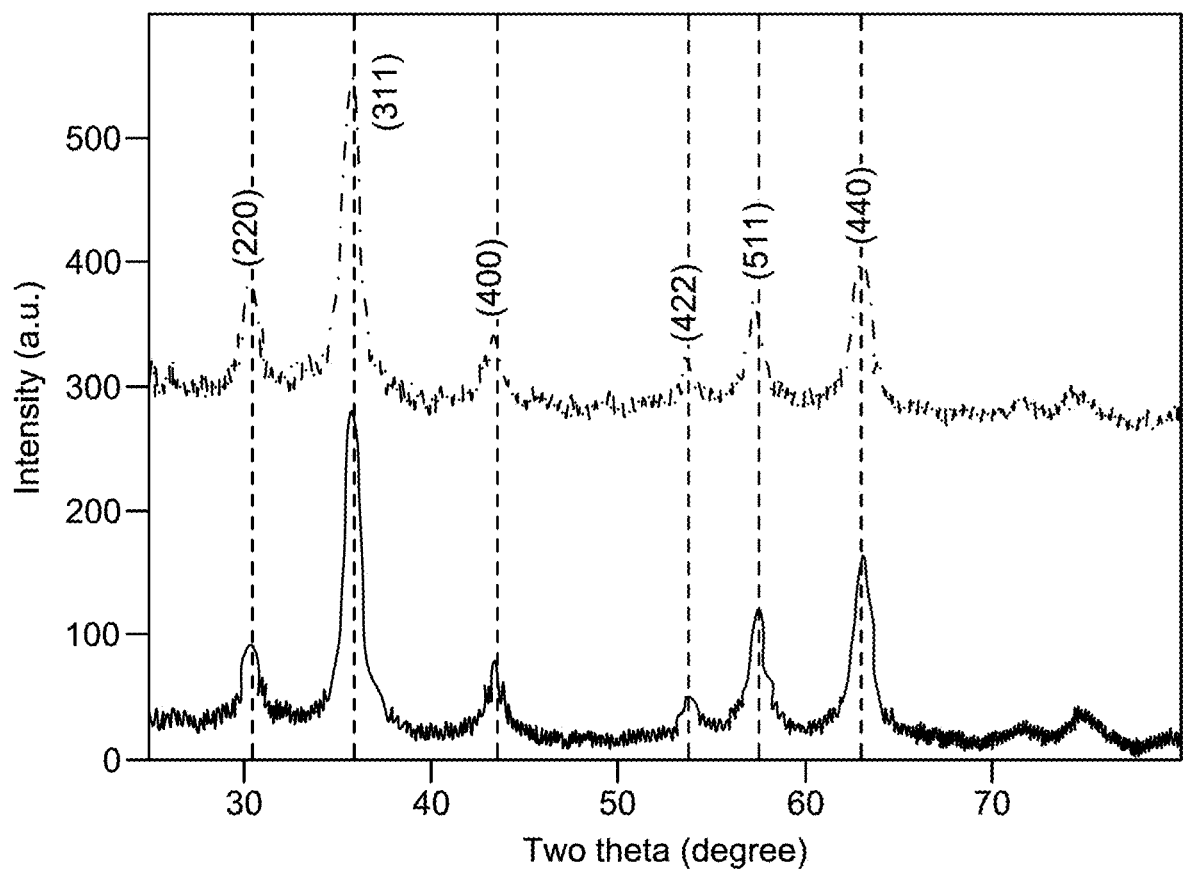
FIG. 12E illustrates a SEM characterization data of an X-ray powder diffraction (XRD) of pure $Fe_3O_4$ and $Fe_3O_4$@dop-Fc-Rh, according to certain embodiments.

In certain embodiments, the Rh complex of magnetic-$Fe_3O_4$-nanoparticle-supported ferrocenyl phosphine catalyst has (i) a first intense peak with a 2 theta (θ) value in a range of 25 to 35° in an X-ray diffraction (XRD) spectrum, preferably 27 to 33°, and more preferably 29 to 31°, (ii) a second intense peak with a 2θ value in a range of 30 to 40° in the XRD spectrum, preferably 32 to 38°, and more preferably 34 to 36°, (iii) a third intense peak with a 2θ value in a range of 37 to 48° in the XRD spectrum, preferably 39 to 46°, and more preferably 42 to 44°, (iv) a fourth intense peak with a 2θ value in a range of 48 to 58° in the XRD spectrum, preferably 50 to 56°, and more preferably 52 to 54°, (v) a fifth intense peak with a 2θ value in a range of 52 to 62° in the XRD spectrum, preferably 54 to 60°, and more preferably 56 to 58°, and (vi) a sixth intense peak with a 2θ value in a range of 58 to 68° in the XRD spectrum, preferably 60 to 66°, and more preferably 62 to 64°, as depicted in FIG. 12E.

Figure 14A:
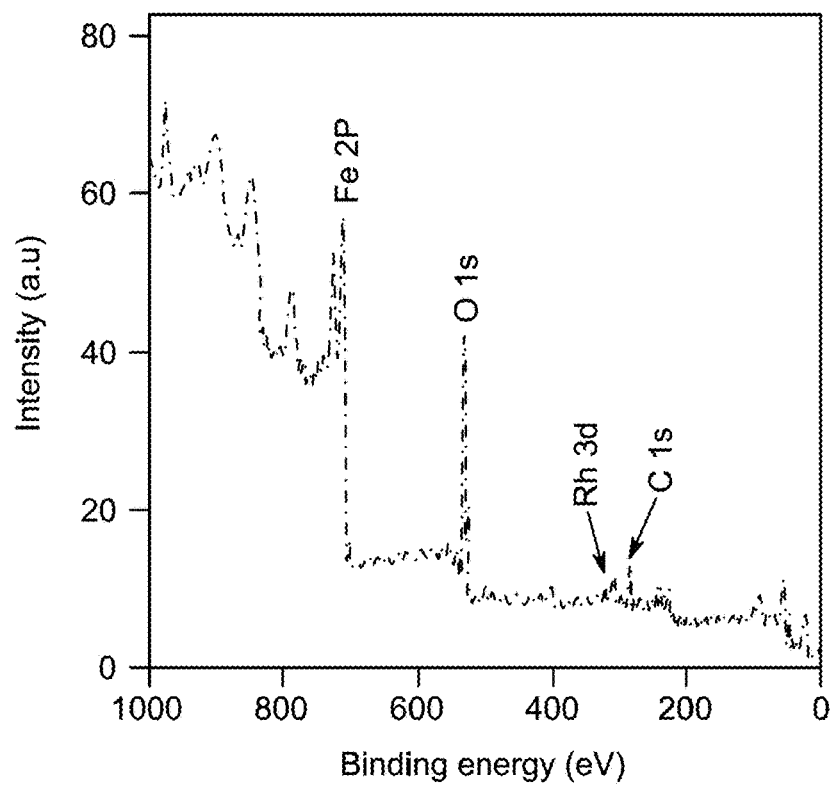
FIG. 14A illustrates a global survey of an X-ray photoelectron spectroscopy (XPS) data for $Fe_3O_4$@dop-Fc-Rh, according to certain embodiments.
Figure 14B:
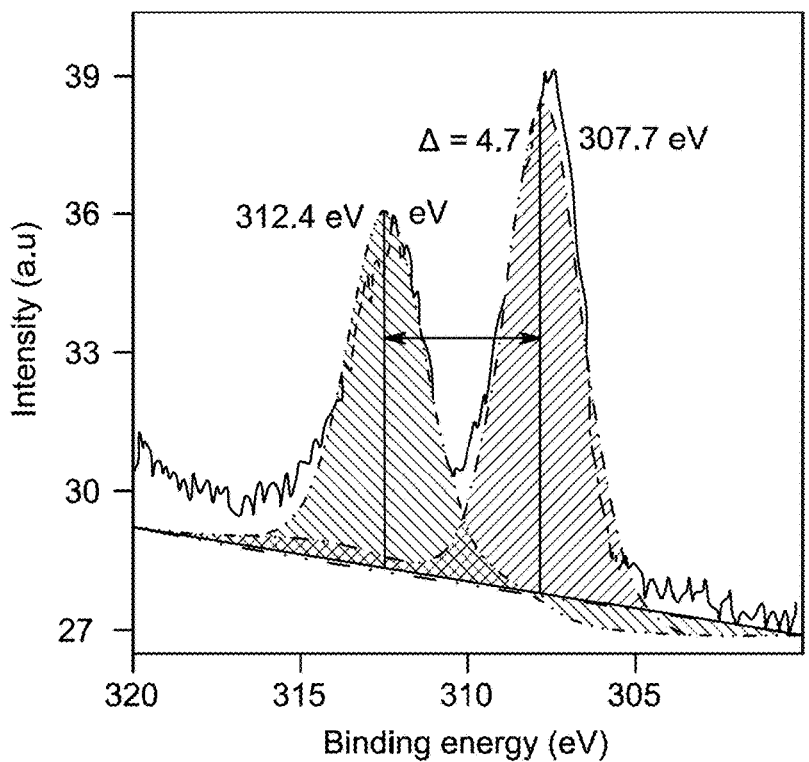
FIG. 14B illustrates XPS data of Rh, according to certain embodiments.

In other embodiments, the Rh complex of magnetic-$Fe_3O_4$-nanoparticle-supported ferrocenyl phosphine catalyst has a first main peak in a range of 305 to 310 electron volt (eV), preferably 306 to 309 eV, or even more preferably 307 to 308 eV, and a second main peak in a rage of 310 to 315 eV, preferably 311 to 314 eV, or even more preferably 312 to 313 eV in an X-ray photoelectron spectroscopy (XPS) spectrum as depicted in FIG. 14B. In a further embodiment, the Rh complex of magnetic-$Fe_3O_4$-nanoparticle-supported ferrocenyl phosphine catalyst has an orbital splitting energy in a range of 1 to 10 eV, preferably 2 to 8 eV, and more preferably 4 to 5 eV.

The phrase "recycling the catalyst" or "reusability" refers to a process whereby the catalyst is washed by an organic solvent, dried, and then added to a new batch of reactants (either for the same or a different type of catalyzed reaction). Preferred organic solvents for washing the catalyst and/or dialysis may include, without limitation, methanol, acetone, ethanol, tetrahydrofuran, acetonitrile, dichloromethane, ether, glycol ether, acetamide, dimethyl acetamide, dimethyl sulfoxide, water, or combinations thereof. The catalyst may be dried in vacuum (e.g., in a pressure of 0.01-100 mbar, 0.1-50 mbar, or 1-10 mbar), and/or with heating, for example, the catalyst may be dried in a vacuum oven. Dried catalyst may be stored in a desiccator until the next run.

In one embodiment, the catalyst is reused for at least 2 runs, preferably at least 10 runs, more preferably at least 20 runs, even more preferably at least 30 runs. In some embodiments, the catalyst may be used continuously for 10-50 days, 20-40 days, or 28-32 days. The catalyst may lose less than 5 wt %, preferably less than 2 wt %, more preferably less than 0.1 wt % of palladium/rhodium/iridium/ruthenium (based on an initial amount of palladium, rhodium, iridium, or ruthenium present in the catalyst) after the catalyst is used for several runs or several days. The yield of the catalyzed reaction may decrease less than 20 percentage points, less than 10 percentage points, or 5 percentage points after the catalyst is used for several runs or several days. Preferably, the yield of the catalyzed reaction decreases 4-8 percentage points after the catalyst is used for 8-12 runs or 29-31 days. The turnover number and the turnover frequency of the catalyst may decrease less than 10%, preferably less than 5%, more preferably less than 2% after the catalyst is used for several runs or several days.

EXAMPLES

The following examples describe and demonstrate a method for making a hydroformylation catalyst described herein. The examples are provided solely for illustration and are not to be construed as limitations of the present disclosure, as many variations thereof are possible without departing from the spirit and scope of the present disclosure.

Example 1: Materials and Methods

All reactions were carried out under an atmosphere of argon (Ar) using standard Schlenk techniques. Solvents were dried using standard procedures. $^1H$, and $^{13}C$ nuclear magnetic resonance (NMR) experiments were performed on a Bruker 400 NMR spectrometer. Chemical shifts were given as δ with tetramethylsilane (TMS) as the internal standard. X-ray diffraction (XRD) patterns were recorded on a Rigaku model Ultima-IV diffractometer employing Cu-Kα radiation (λ=1.5406 Å) at 40 kilo Volts (kV) and 25 milli-amperes (mA) over a 2θ range between 20 and 80°. Transmission electron microscopy (TEM) images were acquired at King Fahd University of Petroleum and Minerals (KFUPM) on a JEOL JEM-2011 TEM, operated at 200 kV with a 4 k×4 k charge-coupled device (CCD) camera (Ultra Scan 400SP, Gatan). High-resolution transmission electron microscopic (HRTEM) images were obtained in an image corrected at a working voltage of 300-kilos electronvolts (KeV). The TEM samples were prepared by dropping the sample on a copper grid from an ethanolic suspension and drying at room temperature. Scanning electron microscope (SEM) samples were prepared from ethanolic suspensions on single-sided alumina tape placed on alumina stubs. The energy-dispersive X-ray spectra (EDS) were collected on a Lyra 3 (Tescan from the Chezch Republic) attachment to the SEM for the elemental analysis and mapping. Gas Chromatography-Mass Spectrometry (GC-MS): Catalytic products were identified using a Shimadzu 2010 Plus (Japan) gas chromatograph coupled with a mass spectrometer. The disappearance of the reactants and sequential appearance of the products was recorded in real-time, identifying the species in terms of their molecular ion (M+) by comparing and matching them with the available Wiley library of the mass spectral database to identify mass fragmentation. The amounts of rhodium (Rh) and iron (Fe) content in the catalyst were determined by Inductively Coupled Plasma Optical Emission Spectrometry (ICP-OES; PlasmaQuant PO 9000—Analytik Jena). The samples were first digested in a mixture of dilute nitric acid ($HNO_3$) and dilute hydrochloric acid (HCl). Calibration curves were prepared for Fe and Co using standard solutions (ICP Element Standard solutions, Merk). The surface chemistry was determined using an X-ray photoelectron spectroscope (XPS) equipped with an Al-Kα micro-focusing X-ray monochromator (ES-CALAB 250Xi XPS Microprobe, Thermo Scientific, MA, USA). The chamber pressure was $2 \times 10^{-9}$ torr. Each XPS spectrum was corrected for steady-state charging by aligning CIs to 284.60 eV. Typical XPS survey spectra of the fabricated films and O1s, $Co2p_{3/2}$, and N1s core-level spectra for the nanocatalyst.

Example 2: Synthesis of dop-Fc $\{\eta^5\text{-}C_5H_5\}Fe\{\eta^5\text{-}C_5H_3\text{-}1\text{-}PPh_2\text{-}2\text{-}CH(Me)NH\text{---}CH_2\text{---}CH_2\text{-}4Ph\text{-}1,2\text{-}OH\}$ (dop-Fc)

A diphenylphosphino-ferrocenylethyl amine acetate (PPFA-OAc) was prepared as per the established known procedure. Dopamine hydrochloride (0.19 g, 1.0 mmol) was added to PPFA-OAc (0.23 g, 0.5 mmol) in anhydrous methanol (10 mL). Then, freshly distilled triethylamine (1 mL) was added to an argon atmosphere under the refluxing conditions at 95 degrees centigrade (° C.) for 24 hours with continuous stirring at the speed of 400 rpm (revolution per minute). Then, the solvent was removed under vacuum and then transferred to a silica gel column using dichloromethane (1 mL) for purification. The desired orange color compound was eluted using a combination of ethyl acetate and methanol (9:1) as an eluent. Recrystallization from methanol/cyclohexane yielded 0.16 g of product (59%).

$^1$H NMR (DMSO-$d_6$): δ 1.42 (3H, $CHCH_3$), 1.76 ($NCH_2CH_2$), 2.14 (2H, $NCH_2CH_2$), 3.58 (5H, $C_5H_5$), 3.66-4.5 (3H, $C_5H_4$), 6.06 (1H, $C_6H_3$), 6.26 (1H, $C_6H_3$), 6.80 (d, 1H, $C_6H_3$), 7.07-7.50 (10H, PPh2), 8.21 (1H, OH), 8.39 (1H, OH).

$^{13}$C NMR (DMSO-$d_6$): 22.57 ($CHCH_3$), 34.63 ($NCH_2CH_2$), 69.71 ($NCH_2CH_2$), 78.92 ($CHCH_3$), 115.43, 119.04, 128.15, 130.14, 130.23 ($C_6H_3$), 131.79, 132.34, 143.20, 144.97 ($C_5H_3$, $C_5H_4$ and $PPh_2$).

FTIR in KBr ($cm^{-1}$): ν=3426 (O—H), 3058 (arC-H), 2920 ($Csp^3$-H) 1522 (arC-C).

Example 3: Surface Functionalization of $Fe_3O_4$ Using dop-Fc ($Fe_3O_4$@dop-Fc-Rh)

$Fe_3O_4$ nanoparticles were prepared as per the known procedure. The freshly prepared $Fe_3O_4$ (100 mg) was taken in chloroform and sonicated for 1 hour to disperse the nanoparticles. Then, dopamine conjugated ligand (dop-Fc) (200 mg) was added to $Fe_3O_4$ suspension and sonicated for another 3 hours under the argon atmosphere. The surface-functionalized magnetic nanoparticles were collected using a magnet kept at the bottom of the flask and decanting the solution. The black powder was washed with dichloromethane (DCM) (3×20 mL) and dried under a vacuum. The obtained materials were subsequently complexed with Rh thereafter. The solution of $[Rh(NBD)Cl]_2$ (0.015 mmol), slightly excess, in dichloromethane, was added to the suspension and stirred for 4 hours under the argon atmosphere. The materials were collected and washed with DCM to remove unreacted metal precursors to produce the $Fe_3O_4$@dop-Fc-Rh catalyst.

Example 4: The Typical Procedure for the Hydroformylation Reaction

The hydroformylation reaction was performed in a high-pressure autoclave (100 mL) equipped with a pressure gauge, a mechanical stirrer, and coupled with a temperature controller. The whole reaction system, including the autoclave, was kept in a functional fume hood fitted with a good suction with 120 cfm airflow. The functionalized magnetic nanoparticles, Fe3O4@dop-Fc-Rh (5 mg), a styrene (60 μL, 0.5 mmol), and an anhydrous DCM (5 mL) were added to a Teflon-lined autoclave vessel under the argon atmosphere. Then, the inert atmosphere was flushed with $CO/H_2$ gas for three cycles and pressurized with CO/H2 (1:1) at 50 bars. The temperature was maintained at 80° C. After 24 h of the reaction, the pressure was released, and the sample was passed through a short silica gel column followed by injection into a GC-MS to determine the conversion and regioselectivity values.

Example 5: A Typical Procedure for the Hydrogenation of Nitroarenes

The catalytic nitroaromatic hydrogenation reactions were performed in the glass reaction tube fitted with the Teflon screwcap in a parallel 10-place reactor coupled with a temperature controller. To a mixture of nitrophenol (35 mg, 0.25 mmol), tetrahydroxydiboron (THDB) (90 mg, 1.0 mmol), magnetic Rh-PPF catalyst (5 mg), and de-ionized water (5 mL) were added. The suspension was stirred with a speed of 250 rpm at 80° C. for 30 min. The reaction progress was monitored by ultraviolet-visible (UV-Vis) and GC-MS. The product was extracted with ethyl acetate (EA) and dried with sodium sulphate. It was passed through a short silica gel column using EA and hexane (6:4) mixture as eluent. The conversion was measured by GC and identified by the GC-MS system.

Example 6: A Typical Procedure for the Hydrogenation of Quinolines

The transfer hydrogenation of quinoline was carried out using the same procedure as stated above with a slight modification. A mixture of quinoline (29 μL, 0.25 mmol), THDB (180 mg, 1 mmol), magnetic catalyst (5 mg), and DI water (5 mL) was added and stirred at 250 rpm. The reaction mixture was heated at 90° C. and the progress of the reaction was monitored by TLC and GC-MS. After cooling, the aqueous solution was extracted with DCM (5 mL), dried with magnesium sulfate, and the solvent was removed under vacuum. The residue was re-dissolved in a minimum amount of DCM and passed through a short silica gel column using a mixture of hexane and ethyl acetate (8:2) as the eluent. The conversion and selectivity were determined by GC-MS.

Catalysis

Example 7: Olefin Hydroformylations

A metal-catalyzed olefin hydroformylation reaction has attracted a lot of attention to produce aldehydes from the reaction of olefins with syngas. The metal-catalyzed olefin hydroformylation reaction was an atom economic process in which one-carbon chain elongation occurs by adding CO and $H_2$ across the π-system of the C=C double bond. The produced aldehyde functionality allows for the skeleton expansion through condensation, amination, Wittig reaction, and so forth to make detergents, soaps, plasticizers, fragrances, and many more commercially viable intermediates. Furthermore, the excess of olefins in naphtha was lowered by hydrogenation over solids catalyst, which was costly and resulted in a marked decrease in the octane rating of the fuel. The reduction in the octane ring was typically corrected by the addition of a highly polluting water-soluble methyl tert-butyl ether (MTBE) or methyl tert-amyl ether (TAME). So, a green method for lowering the olefin content of naphtha through the in-situ conversion of some of the alkenes into valuable C6-C8 oxygenates (aldehydes or alcohols) and that was capable of improving the combustion properties of the fuel was desirable. Also, it was a fact that in the refinery, naphtha contains up to 50 vol % of C5-C7 alkenes in different structures. The elevated number of olefins produced from the refinery catalytic cracking process for gasoline formulation might generate a very viscous polymer or solids, which might block carburetors and injectors of the vehicle. Therefore, a cost-effective and greener approach for olefin conversion to value-added chemicals was desirable [S. Ganji, S. Mutyala, C. K. P. Neeli, K. S. R. Rao and D. R. Burri, RSC Adv., 2013, 3, 11533-11538].

Table 1 shows the hydroformylation reaction of styrene derivatives under the pressure of syngas using $Fe_3O_4$@dop-Fc-Rh catalyst. In table 1, styrene is seen to be quantitatively converted to the aldehyde in DCM at 100° C. with 69% selectivity towards branched aldehyde and 31% selectivity toward linear aldehyde under 50 bar pressures of syngas in 24 hours (entry 1). On lowering the reaction temperature to 80° C., the selectivity of branched aldehyde was increased to 87% with >99% conversion (entry 2). On changing the solvent to a more polar solvent, tetrahydrofuran (THF), the selectivity of branched aldehyde was decreased to 74% under the same conditions (entry 3). The effect of the pressure of syngas was also studied. At 30 bar, both the conversion and selectivity were negatively affected (entry 4). Methyl- and 4-methoxy-substituted styrene was fully converted to aldehyde with 92 and 84% branched product, respectively (entries 5 and 7). A profound effect of the electron-withdrawing group on the aromatic ring was noted. For example, chlorostyrene was easily converted to aldehyde (>99% conversion) with a branched: linear selectivity ratio of 13.2:1 (entry 8). About 66% of 2-bromostyrene was formylated under syngas to form aldehyde with a 76% selectivity towards branched aldehyde (entry 9). A similar trend was observed with the 3-nitrostyrene hydroformylation reaction, where >99% of 3-nitrostyrene was converted to aldehyde with a 15.7:1 branched to the linear ratio (entry 10).

TABLE 1

Hydroformylation reaction of styrene derivatives under the pressusre of syngas using $Fe_3O_4$@dop-Rc-Rh catalyst.

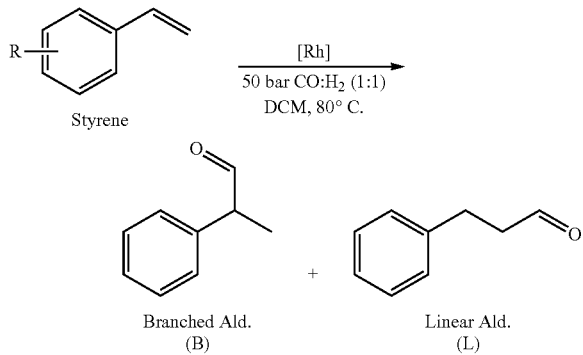

| | | | | | Selectivity (%)[c] | | |
|---|---|---|---|---|---|---|---|
| Entry | Substrate | Pressure (bar) | Temp. (° C.) | Conversion[b] (%) | Branched (B) | Linear (B) | Ratio (B:L) |
| 1 | | 50 | 100 | >99 | 69 | 31 | 2.2:1 |
| 2 | | 50 | 80 | >99 | 87 | 13 | 6.7:1 |
| 3 | | 50 | 80 | >99 | 74 | 36 | 2:1 |
| 4 | | 30 | 80 | 81 | 91 | 9 | 10:1:1 |

TABLE 1-continued

Hydroformylation reaction of styrene derivatives under the pressusre of syngas using Fe₃O₄@dop-Rc-Rh catalyst.

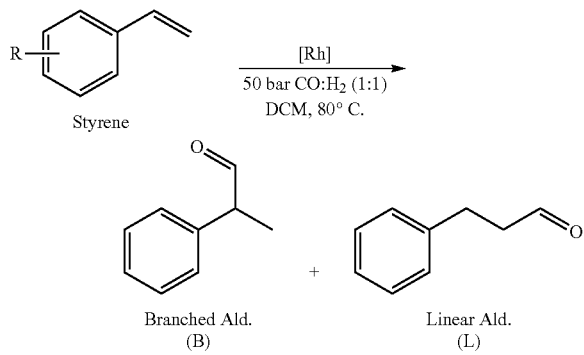

| Entry | Substrate | Pressure (bar) | Temp. (° C.) | Conversion[b] (%) | Selectivity (%)[c] Branched (B) | Linear (B) | Ratio (B:L) |
|---|---|---|---|---|---|---|---|
| 5 | 4-methylstyrene | 50 | 80 | >99 | 92 | 8 | 11.5:1 |
| 6d |  | 50 | 80 | 61 | 65 | 35 | 1.9:1 |
| 7 | 4-methoxystyrene | 50 | 80 | >99 | 84 | 16 | 5.25:1 |
| 8 | 4-chlorostyrene | 50 | 80 | >99 | 93 | 7 | 13.2:1 |
| 9 | 2-bromostyrene | 50 | 80 | 66 | 76 | 24 | 3.2:1 |
| 10 | 3-nitrostyrene | 50 | 80 | >99 | 94 | 6 | 15.7:1 |

[a]Reaction condition: 0.5 mmol substrate, 5 mg catalyst, 5 mL DCM at 80° C. for 24 h;
[b]measured by GC;
[c]identified by GCMS;
[d]done using Fe₃O₄ @ Rh(I) (without ligand)

Catalytic reduction of nitroaromatic compounds to corresponding amines has gained momentum for industrially important polymers, pharmaceuticals dyes, and pigments due to its high selectivity and the generation of less industrial waste than the conventional reduction methods. For example, typically, nitroarenes were often converted to amines using Raney® nickel, Fe/HCl, Sn/HCl, or molecular hydrogen with or without metal. However, the usage of highly flammable gaseous hydrogen and a large amount of toxic organic solvents needed for these methods posed a hazard. Therefore, developing a robust catalytic system with higher conversion of nitroaromatics to amines and greater ecological credentials was desirable. In the experiment, the catalytic transfer hydrogen (CTH) process was safer and simpler. Here, the required hydrogen comes from the sacrificial hydrogen donor, such as ammonium formate (HCOONH₄), sodium borohydride (NaBH₄), and formic acid (HCOOH), and so forth, instead of molecular hydrogen from the gas tank. Numerous gold (Au-), rhodium (Rh-), ruthenium (Ru-), platinum (Pt-), and cobalt (Co-) based systems have been developed successfully for the CTH process, but the separation of the catalysts from the product after the reaction is still a challenge. In the experiment, magnetic nanoparticles supported phosphinate metal complexes as a new catalytic system that might impart effortless separation without sacrificing reactivity and selectivity.

The nitroarene reduction in water was carried out with the optimized reaction conditions of 5 mg catalyst, 0.25 mmol substrate, 1 mmol THDB, and 5 mL DI-$H_2O$ at 80° C. for 30 mins to 1 h. The results are shown in Table 2. The reduction proceeded smoothly with both the catalysts. For instance, nitrobenzene was quantitatively hydrogenated to produce aniline. Meanwhile, the Rh-catalyzed hydrogenation of 2-nitrotoluene produced 89% conversion with exclusive selectivity towards o-toluidine. A similar trend of reactivities was noted with 3-nitrotolune, 4-nitrophenol, and 4-nitroanisole substrates regardless of a functional group attached to the benzene ring (Entries 3-5). A significant decrease in selectivity (87%) was observed during the 4-chloro-nitrobenzene hydrogenation to 4-chloro-aminobenzene using this catalyst at 60° C. (entry 6) with 13% de-chlorinated product. It was also observed that the reaction was relatively slower as it took a longer time (1 h) to complete the reaction at a low temperature. But, at higher temperature 80° C., the reaction completes in 30 min with more de-chlorinationed (57%) product. In the case of 4-bromo nitrobenzene, 68% selectivity was noted, and the remaining derivative was detected as a de-brominated reduced product, aniline (32%) (Entry 8). The effect of steric influence was also investigated. For example, the hydrogenation of 2,6-dimethyl nitrobenzene clearly shows that a higher steric hindrance is operative as it is affected the conversion, slightly (95% conversion) (Entry 9). This is probably due to the microenvironment around the Rh metal center, which negatively influences the transition states, leading to a lower conversion.

TABLE 2

Nitroarenes hydrogenation using Rh complexes of $Fe_3O_4$ @ dop-Fc in water.[a]

| Entry | Substrates | Conv. (%)[b] | Selectivity (%)[c] |
|---|---|---|---|
| 1 | $NO_2$-phenyl | >99 | >99 |
| 2 | 2-nitrotoluene | 89 | >99 |
| 3 | 3-nitrotoluene | >99 | >99 |
| 4 | 4-nitrophenol | >99 | >99 |
| 5 | 4-nitroanisole | >99 | >99 |
| 6[d] | 4-chloronitrobenzene | >99 | 87 |

TABLE 2-continued

Nitroarenes hydrogenation using Rh complexes of $Fe_3O_4$ @ dop-Fc in water.[a]

| Entry | Substrates | Conv. (%)[b] | Selectivity (%)[c] |
|---|---|---|---|
| 7 | | >99 | 47 |
| 8[d] | 4-bromonitrobenzene | >99 | 68 |
| 9[d] | 2,6-dimethylnitrobenzene | 95 | >99 |

[a]Reaction condition: 5 mg catalyst, 0.25 mmol substrate, 1 mmol THDB, 5 mL DI-H20 at 80° C. for 30 min;
[b]measured by GC;
[c]identified by GC-MS;
[d]reaction took 1 h to complete at 60° C.

Example 9: Quinoline Hydrogenations 1,2,3,4-tetrahydroquinoline (py-THQ) moieties were important building blocks in many important natural products, pharmaceuticals, agrochemicals, and various other fine chemicals and hence, have found broad commercial applications. However, quinoline hydrogenations generally involved the possibility of the formation of three products, py-THQ, 5,6,7,8-tetrahydroquinoline (bz-THQ), and decahydroquinoline (DHQ). Achieving the chemoselective hydrogenation of the nitrogen-containing ring was challenging. In the experiment, numerous catalysts have been reported for the transfer hydrogenation of quinolines with excellent results. Despite the high activity and selectivity of such systems, difficulties in separating the catalyst by filtration, precipitation, and centrifugation from the products limited the scope of its industrial applications. Therefore, magnetic nanoparticle-supported phosphinate ligand complexed with Rh might be a choice for the efficient route for transfer hydrogenation in terms of product selectivity and effortless separation.

A catalyst system was prepared for the transfer hydrogenation of quinolines. Firstly, quinoline was used as a benchmark substrate to optimize the reaction conditions in the water. At 90° C., 0.25 mmol of quinoline was quantitatively converted to py-THQ in 1 h using 1 mmol of THDB (Table 3). The effect of substituent was also investigated. For example, 4-methyl quinoline was difficult to hydrogenate (entry 2), resulting in 18% conversion but >99% selectivity. The lower conversion might be due to the electron-donating group, which facilitates to resist the disruption of the aromaticity of the pyridine ring for the hydrogenation under the reaction conditions. Meanwhile, 8-methylquinoline produced 93% of the pyridine ring hydrogenated product. The disubstituted, 6-fluoro-2-methylquinoline was employed for the transfer hydrogenation and yielded 49% converted product with >99% selectivity.

TABLE 3

$Fe_3O_4$ @ dop-Fc-Rh-catalyzed quinoline transfer hydrogenation using THDB as a sacrificial hydrogen source.[a]

| Entry | Substrate | Product | Conversion[b] (%) | Selectivity[c] (%) |
|---|---|---|---|---|
| 1 | quinoline | 1,2,3,4-tetrahydroquinoline | >99 | >99 |
| 2 | 4-methylquinoline | 4-methyl-1,2,3,4-tetrahydroquinoline | 18 | >99 |

TABLE 3-continued

Fe$_3$O$_4$ @ dop-Fc-Rh-catalyzed quinoline transfer hydrogenation using THDB as a sacrificial hydrogen source.[a]

| Entry | Substrate | Product | Conversion[b] (%) | Selectivity[c] (%) |
|---|---|---|---|---|
| 3 | (8-methylquinoline) | (8-methyl-1,2,3,4-tetrahydroquinoline) | 93 | >99 |
| 4 | (6-fluoro-2-methylquinoline) | (6-fluoro-2-methyl-1,2,3,4-tetrahydroquinoline) | 49 | >99 |

[a]Reaction condition: 0.25 mmol substrate, 1 mmol THDB, 5 mL DI-H$_2$O at 90° C. for 1 h;
[b]measured by GC;
[c]identified by GCMS.

Example 10: Reusability

Figure 10A:
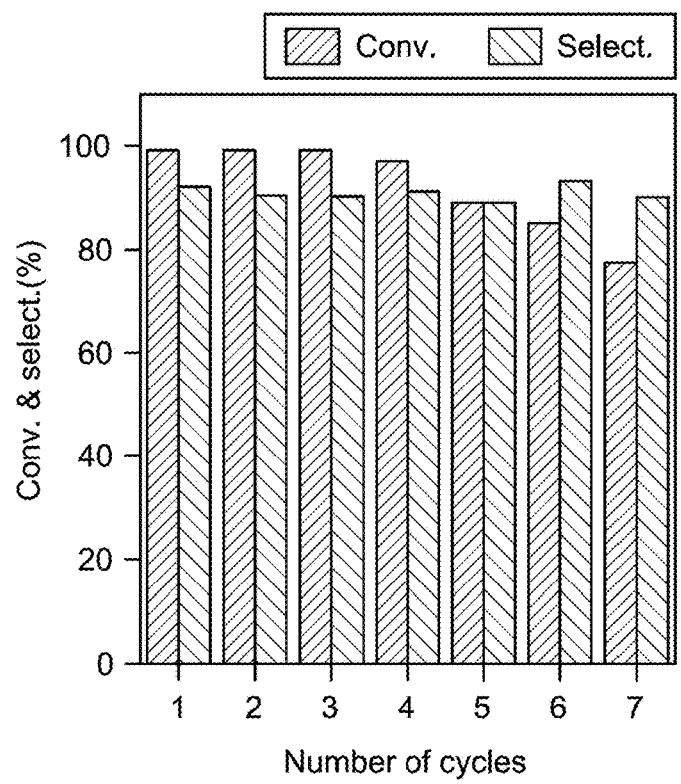
FIG. 10A illustrates the reusability of catalyst for hydroformylations of 4-methylstyrene under syngas pressure, according to certain embodiments.
Figure 10B:
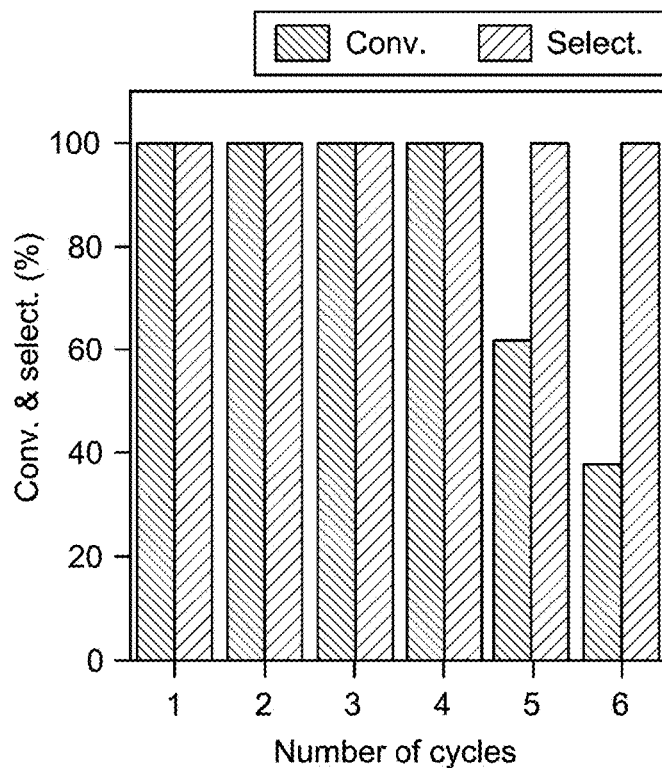
FIG. 10B illustrates the reusability of catalyst for nitrobenzene, according to certain embodiments.
Figure 10C:
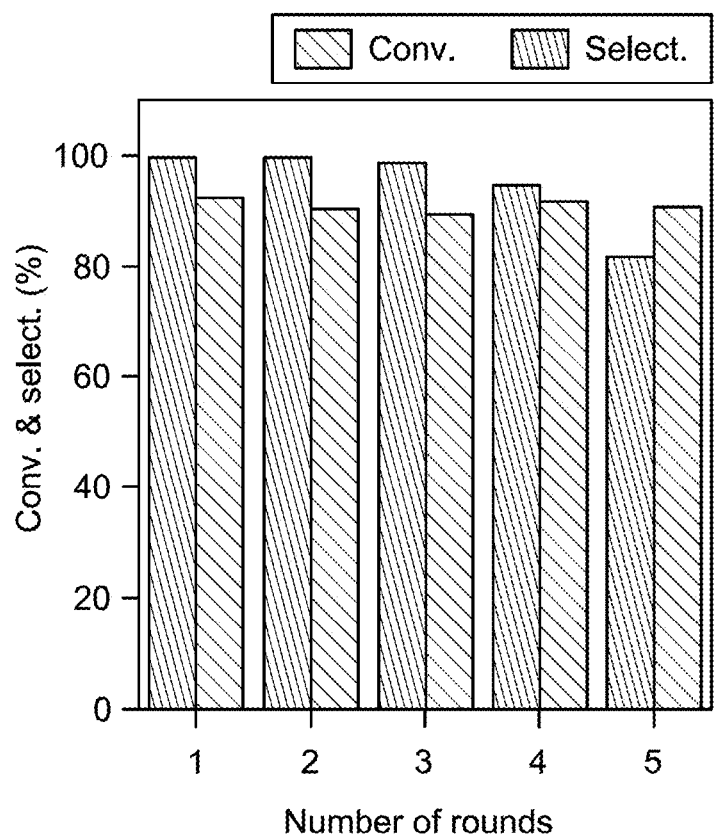
FIG. 10C illustrates the reusability of catalyst for quinoline transfer hydrogenation using tetrahydroxydiboron (THDB) as a hydrogen source in water, according to certain embodiments.

The catalyst was separated from the reaction mixture by using a simple magnet and then washed repeatedly with an organic solvent. The stability of the catalyst was determined by reusing it for the next consecutive cycles. In the case of hydroformylation reaction, 4-methylstyrene was used (FIG. 10A). The reusability data showed the stability of the catalyst for up to 4 consecutive cycles, even at higher pressure. After this, a gradual decrease in the conversion was noticed (FIG. 10A). At the 7$^{th}$ consecutive cycle, the conversion of 4-methylstyrene hydroformylation was 77%. It was worth noting that in all the cycles (up to 7), the selectivity was almost unaffected under 50 bar pressures of syngas. The reusability data on a transfer hydrogenation reaction of nitrobenzene showed a relatively stable performance for up to 4 consecutive cycles before the catalyst started to deteriorate drastically (FIG. 10B). The conversion produced after the 5$^{th}$ cycle was 61% to the reduced product. The reduction could be due to the presence of amines, which can interfere with the complexed Rh metal and subsequently lead to the leaching of it from the system. The robustness of the catalyst for the multiple cycles was also evaluated with the quinoline transfer hydrogenation (FIG. 10C). The reactivity of the catalyst was steadily decreased after the 3$^{rd}$ cycle and the trend continues up to the 5$^{th}$ cycle with unchanged selectivity.

Results and Discussions

Example 11: Synthesis and Characterizations

FIG. 11 illustrates the synthetic routes leading to the formation of target compounds for the present experiment. Special attention was paid to factors, such as robust surface functionalization and higher payload, thereby increasing the metal center's stability and number on the magnetic nanoparticles. In the experiment, N,N-dimethyl-1-[-2-(diphenyl phosphene)ferrocenyl]ethylamine (PPFA) was further acetylated with acetic anhydride at 100° C. (1102), then alkoxide of titanium was used with ethanol using triethylamine (TEA) (1104), organolithium reagent like butyllithium was used (1106), later acetic anhydride was used (1108) and then substituted with dopamine hydrochloride in methanol using triethylamine (TEA) as a mild base 1110. In general, two strategies may be adopted for loading metals on the surface of the magnetic nanoparticles: 1) direct incorporation of metal ions into the sea of hydroxyl groups present on the magnetic nanoparticles and 2) addition of metal ions to the surface-functionalized with appropriate coordinating ligands on nanoparticles. Here, the later route was followed to enhance the influence of the homogeneous part, a metal-ligand complex, over the direct incorporation of metal ions on the surface of the nanoparticles. Although, some portion of direct immobilization of the metal on the surface cannot be ruled out. The role of the ligand was verified by the preparation of a sample through the direct route to form Fe$_3$O$_4$@Rh(I) for comparison purposes and the results are shown in Table 1. The total metal content was measured by inductively coupled plasma optical emission spectroscopy (ICP-OES), and the result showed 0.22 mmol of Rh per gram of the magnetic nanoparticles.

FIG. 12A-FIG. 12E illustrate that Fe$_3$O$_4$@dop-Fc-Rh nanoparticles were imaged using a focused beam scanning electron microscope (FESEM). FIG. 12A illustrates the FESEM revealed the highly dispersed spherical nanoparticles of Fe$_3$O$_4$. FIG. 12B illustrates the FESEM image of surface decorated nanoparticles (Fe$_3$O$_4$@dop-Fc-Rh) demonstrating the unchanged morphology in terms of shape and size. FIG. 12C illustrates the homogeneous distribution of the Rh ion on Fe metal is detected by the confined area elemental mapping, which indicates the uniform decoration. FIG. 12D illustrates Fe and Rh which were identified by the energy-dispersive X-ray spectroscopy (EDS). The inset of FIG. 12D exhibits the magnetic nature of Fe$_3$O$_4$@dop-Fc-Rh nanoparticles. FIG. 12E demonstrates the XRD signature of the catalyst compared with the parent magnetite (Fe$_3$O$_4$). The XRD patterns of magnetite (Fe$_3$O$_4$) display characteristics diffraction at 2θ=30.2, 35.7, 43.1, 53.4, 57.1, and 63.2°, which were assigned to the (220), (311), (400), (422), (511), and (440) planes with cubic structure (JCPDS card No. 01-075-0449), respectively. However, decorated magnetic nanoparticles with dop-Fc-Rh demonstrated an unchanged reflection of the magnetite. It was in line with the known understanding that a small amount of Rh and amorphous ligand on the surface of the magnetic nanoparticles generally did not affect the crystallinity of the support materials.

Figure 13A:
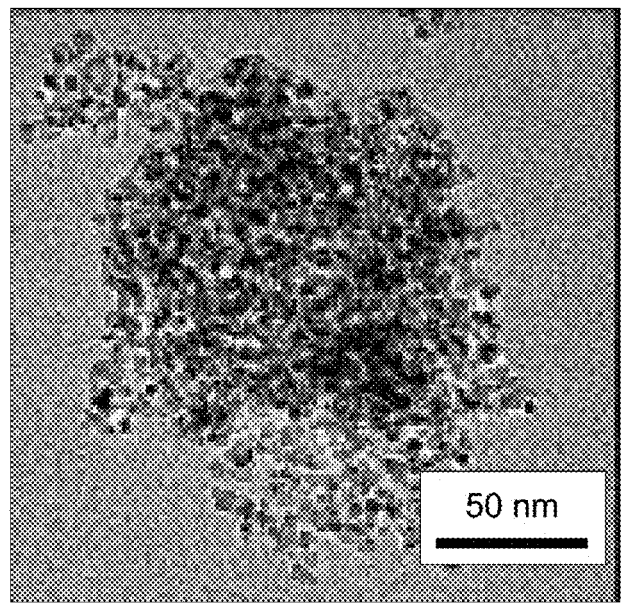
FIG. 13A illustrates a transmission electron microscope (TEM) image of pure $Fe_3O_4$, according to certain embodiments.
Figure 13B:
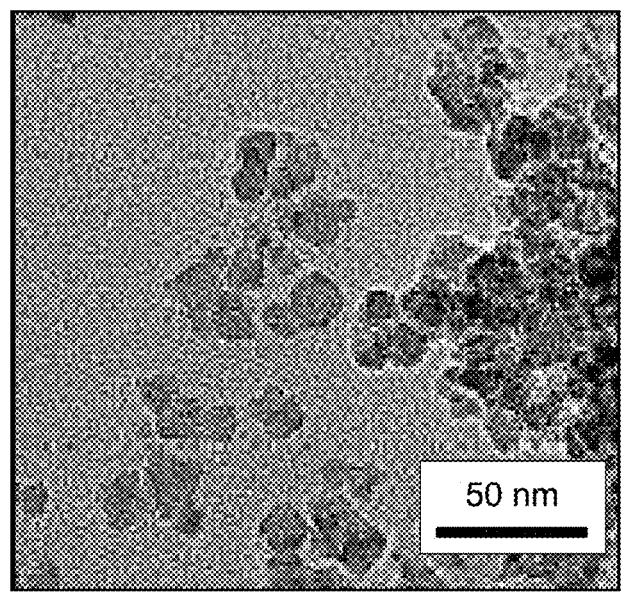
FIG. 13B illustrates a TEM image of $Fe_3O_4$@dop-Fc-Rh, according to certain embodiments.
Figure 13C:
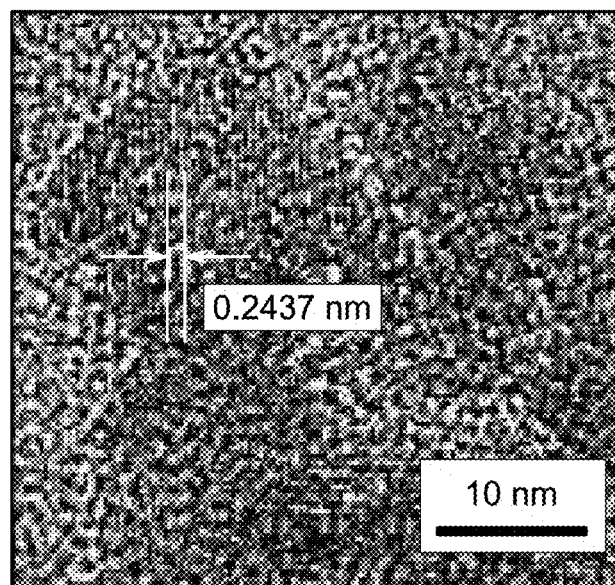
FIG. 13C illustrates a TEM image of a high-resolution transmission electron microscopy (HRTEM) of $Fe_3O_4$@dop-Fc-Rh catalyst, according to certain embodiments.
Figure 13D:
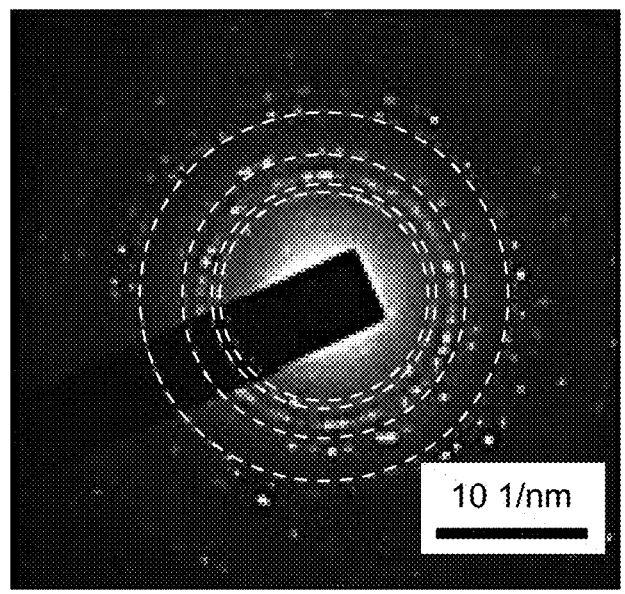
FIG. 13D illustrates a selected area electron diffraction (SAED) pattern of the $Fe_3O_4$@dop-Fc-Rh, according to certain embodiments.

FIGS. 13A-13D illustrate the prepared Fe$_3$O$_4$ and Fe$_3$O$_4$@dop-Fc-Rh were imaged by the transmission electron microscope (TEM). FIG. 13A revealed a particle size of 7-9 nm with a uniform distribution of pure $Fe_3O_4$. FIG. 13B illustrates the homogeneity and distribution of the particles all over the area are markedly improved on the surface functionalization of $Fe_3O_4$. FIG. 13C illustrates high-resolution TEM (HRTEM) images further confirm the crystalline nature of the $Fe_3O_4$, which was also supplemented by the XRD data. The interplanar distance (d-spacing) yielded 0.2437 nm, which corresponds to the (311) plane of the magnetite ($Fe_3O_4$) with a cubic crystal structure. FIG. 13D illustrates a very good, selected area diffraction (SAED) pattern with the possible (hkl) indices. The Fourier-transform infrared (FTIR) spectroscopic data revealed the red-shift of the Fe—O bond vibrational frequency from 586 nm to 597 nm upon the surface functionalization with dihydoxy-lated dopamine conjugate. The presence of C—H and C—C bond stretching frequencies at 2933 and 1435 $cm^{-1}$ further confirmed the aromatic rings of the ligand on the surface.

The surface composition and oxidation states of the constituent elements were identified by X-ray photoelectron spectroscopy (XPS). FIG. 14A illustrates the global survey, which depicted the presence of constituent elements, such as Fe, C, O, and Rh, at their corresponding binding energies. Oxidation states of the Rh were evaluated by fitting the spectrum. FIG. 14B demonstrates the Rh $3d_{5/2}$ and $3d_{3/2}$ peaks at 307.7 and 312.4 eV, respectively, that can be assigned to the Rh(I) species with the orbital splitting energy A=4.7 eV.

Rh-based $Fe_3O_4$@dop-Fc catalysts were prepared and characterized, and their multi-functionality was tested using a series of catalytic reactions. Olefin hydroformylation reaction produced quantitative conversion with a 15.7:1 branched to linear aldehyde selectivity in the presence of 50 bar pressure of syngas at 80° C. in 24 hours. Nitroarene was successfully hydrogenated to aminoarenes. 4-chloro- and 4-bromo-nitrobenzene were converted to the corresponding amine with 87 and 68% selectivity, respectively. Quinoline was exclusively hydrogenated to py-THQ in water. The catalyst survived under high pressure after seven rounds of reactions. The magnetic catalyst was highly efficient for the transfer hydrogenation process for multiple cycles using a sacrificial hydrogen donor.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for making a magnetic-nanoparticle-supported catalyst for hydrogen transfer and hydroformylation reactions, comprising:
reacting a ferrocenyl phosphine compound with an amino alcohol compound to form a ligand having a ferrocene unit comprising a central iron atom, an unsubstituted cyclopentadienyl (Cp) ring, a substituted Cp ring substituted with (i) an alkyl group having an amine group and a phenyl group having at least one hydroxyl group, and (ii) one phosphine group;
wherein the Cp ring and the alkyl substituted Cp ring are bound to the central iron atom;
wherein the phosphine group is attached to the alkyl substituted Cp ring;
anchoring the ligand to a surface of magnetic nanoparticles via an oxygen atom of the hydroxyl group to form a ligand complex;
collecting the ligand complex with a magnet;
combining the ligand complex with a metal precursor comprising Rh to bind the metal precursor with the ligand complex and form the magnetic-nanoparticle-supported catalyst.

2. The method of claim 1, further comprising:
acylating a ferrocene and reductive aminating with an alkylamine to provide an alkylamine substituted ferrocene;
phosphorylating the alkylamine substituted ferrocene with an organophosphorus compound to provide an alkylamine substituted ferrocenyl phosphine;
wherein the alkylamine substituted ferrocenyl phosphine comprises the phosphine group and an alkylamine group, and wherein the phosphine group and the alkylamine group are on the same Cp ring;
acylating the alkylamine substituted ferrocenyl phosphine to provide the ferrocenyl phosphine compound.

3. The method of claim 2, wherein:
the alkylamine is dimethylamine;
the organophosphorus compound is diphenylphosphine chloride;
the alkylamine substituted ferrocenyl phosphine is N,N-dimethyl-1-[-2-(diphenyl phospheno)ferrocenyl]ethyl-amine (PPFA);
the ferrocenyl phosphine compound is 1-[-2-(diphenyl phospheno)ferrocenyl]ethylacetate (PPFA-OAc);
the amino alcohol compound is dopamine hydrochloride (dop);
the ligand is dopamine ferrocenyl phosphine (dop-Fc);
the magnetic nanoparticles are superparamagnetic $Fe_3O_4$ nanoparticles, in the form of spheres;
the ligand complex is a magnetic-$Fe_3O_4$-nanoparticle-supported dopamine ferrocenyl phosphine;
the metal precursor is bicyclo[2.2.1]hepta-2,5-diene-rhodium(I) chloride dimer; and
the magnetic-nanoparticle-supported catalyst is a Rh complex of the magnetic-$Fe_3O_4$-nanoparticle-supported dopamine ferrocenyl phosphine.

4. The method of claim 1, further comprising:
sonicating the magnetic nanoparticles to form a first suspension;
mixing the ligand and the suspension, and sonicating to form a second suspension comprising ligand anchored magnetic nanoparticles; and
wherein the magnetic nanoparticles are $Fe_3O_4$ nanoparticles;
wherein the ligand is dop-Fc; and
wherein the ligand anchored magnetic nanoparticles are magnetic-$Fe_3O_4$-nanoparticle-supported dopamine ferrocenyl phosphine nanoparticles.

5. The method of claim 1, wherein the magnetic-nanoparticle-supported catalyst has 0.2 to 0.3 mmol of Rh per gram of the catalyst.

6. The method of claim 1, wherein the magnetic-nanoparticle-supported catalyst has a particle size in a longest dimension of 5 nm to 10 nm.

7. The method of claim 1, wherein individual crystals of magnetite ($Fe_3O_4$) within the magnetic-nanoparticle-supported catalyst have an interplanar distance of 0.2 nm to 0.25 nm between the individual crystals.

8. The method of claim 7, wherein the individual crystals of magnetite are uniformly distributed throughout the magnetic-nanoparticle-supported catalyst.

9. The method of claim 1, wherein the magnetic-nanoparticle-supported catalyst has a crystalline morphology.

* * * * *